United States Patent
Fenton et al.

(10) Patent No.: US 10,663,567 B2
(45) Date of Patent: May 26, 2020

(54) FIELD CALIBRATION OF A STRUCTURED LIGHT RANGE-SENSOR

(71) Applicant: MICROSOFT TECHNOLOGY LICENSING, LLC, Redmond, WA (US)

(72) Inventors: Michael S. Fenton, Sunnyvale, CA (US); John Peter Godbaz, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 88 days.

(21) Appl. No.: 15/971,765

(22) Filed: May 4, 2018

(65) Prior Publication Data
US 2019/0339369 A1   Nov. 7, 2019

(51) Int. Cl.
| | | |
|---|---|---|
| *G06K 9/00* | (2006.01) | |
| *G01S 7/497* | (2006.01) | |
| *G06T 7/80* | (2017.01) | |
| *G01S 17/89* | (2020.01) | |
| *G06T 7/00* | (2017.01) | |

(52) U.S. Cl.
CPC ............ *G01S 7/4972* (2013.01); *G01S 17/89* (2013.01); *G06T 7/001* (2013.01); *G06T 7/85* (2017.01); *G06T 2207/10028* (2013.01)

(58) Field of Classification Search
CPC ....... G01S 7/4972; G01S 17/89; G06T 7/001; G06T 7/85; G06T 2207/10028; G01B 11/2518; G01B 11/026; G01B 11/2513; G01B 11/00
See application file for complete search history.

(56) References Cited

U.S. PATENT DOCUMENTS

| | | | | |
|---|---|---|---|---|
| 8,803,967 | B2 * | 8/2014 | Oggier | G01S 7/4814 348/135 |
| 9,280,829 | B1 * | 3/2016 | Lewis | H04N 13/254 |
| 9,329,035 | B2 | 5/2016 | Oggier | |

(Continued)

FOREIGN PATENT DOCUMENTS

WO    2016076796 A1    5/2016

OTHER PUBLICATIONS

Xiaobo Chen et al., "Accurate calibration for a camera-projector measurement system based on structured light projection", Optics and Lasers in Engineering 47 (2009) pp. 310-319.*

(Continued)

*Primary Examiner* — Samir A Ahmed
(74) *Attorney, Agent, or Firm* — Shook, Hardy & Bacon LLP

(57) ABSTRACT

The technology described herein recalibrates a structured light sensor in the field using time-of-flight sensor data. Structured light sensors are sensitive to mechanical changes that result in decreased accuracy. A structured light system calculates the range to an object by comparing a reference image to the actual image of the scene. The reference image is what the projected light pattern would look like on a flat object at a known distance. When the projected image changes, the reference image no longer matches the projected pattern. The calibration technology described herein captures a new reference image based on the current sensor characteristics using a time-of-flight capable sensor as the structured light imaging sensor.

20 Claims, 12 Drawing Sheets

(56) References Cited

U.S. PATENT DOCUMENTS

| | | | |
|---|---|---|---|
| 9,330,464 | B1 | 5/2016 | Ackerman et al. |
| 9,947,099 | B2* | 4/2018 | Bleyer ............... G01B 11/2513 |
| 2006/0017720 | A1* | 1/2006 | Li ..................... G01B 11/2504 |
| | | | 345/419 |
| 2009/0059011 | A1* | 3/2009 | Sun ................... G01B 11/2504 |
| | | | 348/187 |
| 2010/0074532 | A1 | 3/2010 | Gordon et al. |
| 2011/0025843 | A1* | 2/2011 | Oggier ................ G01S 7/4814 |
| | | | 348/135 |
| 2012/0056982 | A1 | 3/2012 | Katz et al. |
| 2015/0062558 | A1 | 3/2015 | Koppal et al. |
| 2015/0292876 | A1 | 10/2015 | Pettersson et al. |
| 2015/0319347 | A1 | 11/2015 | Cottrell |
| 2016/0006914 | A1 | 1/2016 | Neumann |
| 2016/0109575 | A1 | 4/2016 | Oggier et al. |
| 2016/0266647 | A1 | 9/2016 | Leheup |
| 2017/0097417 | A1 | 4/2017 | Wang |
| 2017/0163969 | A1* | 6/2017 | Cronie ............... G01B 11/2513 |
| 2017/0243374 | A1* | 8/2017 | Matsuzawa ........... G01B 11/00 |
| 2017/0272651 | A1 | 9/2017 | Mathy et al. |
| 2017/0329012 | A1* | 11/2017 | Buttgen ................ G01S 17/36 |
| 2018/0033146 | A1* | 2/2018 | Bleyer ............... G01B 11/2513 |
| 2018/0211398 | A1 | 7/2018 | Schmidt |
| 2018/0275278 | A1* | 9/2018 | Yamada ................ G01C 3/085 |
| 2019/0079192 | A1 | 3/2019 | Fenton et al. |

OTHER PUBLICATIONS

Daniel Moreno et al., "Simple, Accurate, and Robust Projector-Camera Calibration", 2012 Second Joint 3DIM/3DPVT Conference: 3D Imaging, Modeling, Processing, Visualization & Transmission, IEEE 2012, pp. 464-471.*

Beiwen Li et al., "Novel calibration method for structured-light system with an out-of-focus projector", 2014 Optical Society of America, Applied Optics, Jun. 2014, vol. 53, No. 16, Jun. 2014, pp. 3415-3426.*

Sergi Foix et al., "Lock-in Time-of-Flight (ToF) Cameras: A Survey", IEEE Sensors Journal, vol. 11, No. 9, Sep. 2011, pp. 1917-1926.*

T. Kahlmann et al., "Calibration for Increased Accuracy of the Range Imaging Camera Swissranger", ISPRS Commission V Symposium 'Image Engineering and Vision Metrology', IAPRS vol. XXXVI, Part 5, Dresden Sep. 25-27, 2006, pp. 136-141.*

Decker, et al., "Performance Evaluation and Clinical Applications of 3D Plenoptic Cameras", In Proceedings of International Society for Optics and Photonics, vol. 9494, Next-Generation Robotics II; and Machine Intelligence and Bio-inspired Computation: Theory and Applications IX, 94940B, Jun. 18, 2015, 11 Pages.

"International Search Report and Written Opinion Issued in PCT Application No. PCT/US19/029253", dated Aug. 9, 2019, 12 Pages.

"Non Final Office Action Issued in U.S. Appl. No. 15/698,728", dated May 29, 2018, 10 Pages.

Zhu, et al., "Reliability Fusion of Time-of-Flight Depth and Stereo Geometry for High Quality Depth Maps", In IEEE Transactions on Pattern Analysis and Machine Intelligence, vol. 33, Issue 7, Jul. 2011, 15 Pages.

"Non Final Office Action Issued in U.S. Appl. No. 15/698,728", dated May 23, 2019, 16 Pages.

"Final Office Action Issued in U.S. Appl. No. 15/698,728", dated Nov. 21, 2018, 14 Pages.

"International Search Report and Written Opinion Issued in PCT Application No. PCT/US18/038878", dated Sep. 21, 2018, 14 Pages.

"Notice of Allowance Issued in U.S. Appl. No. 15/698,728", dated Nov. 25, 2019, 11 Pages.

* cited by examiner

1100

```
┌─────────────────────────────────────────────────┐
│ EMIT STRUCTURED LIGHT TOWARDS A CALIBRATION     │
│ SCENE FROM A STRUCTURED LIGHT EMITTER, THE      │──1110
│ STRUCTURED LIGHT COMPRISING A PLURALITY OF      │
│ INDIVIDUAL EMITTED UNITS FORMING A STRUCTURED   │
│ ARRANGEMENT                                     │
└─────────────────────────────────────────────────┘
                        │
┌─────────────────────────────────────────────────┐
│ EMIT MODULATED LIGHT TOWARDS THE CALIBRATION    │
│ SCENE FROM A MODULATED LIGHT EMITTER, THE       │──1120
│ MODULATED LIGHT BEING MODULATED FOR MAKING      │
│ TIME-OF-FLIGHT (TOF) DEPTH CALCULATIONS         │
└─────────────────────────────────────────────────┘
                        │
┌─────────────────────────────────────────────────┐
│ CAPTURE, THROUGH AN IMAGE SENSOR, A PLURALITY   │
│ OF CALIBRATION IMAGES OF THE STRUCTURED LIGHT   │
│ AND THE MODULATED LIGHT REFLECTED OFF THE       │──1130
│ CALIBRATION SCENE, THE CALIBRATION IMAGES       │
│ CAPTURED WITH THE IMAGE SENSOR AT MORE THAN     │
│ ONE DISTANCE FROM THE CALIBRATION SCENE         │
└─────────────────────────────────────────────────┘
                        │
┌─────────────────────────────────────────────────┐
│ FOR AN INDIVIDUAL CALIBRATION IMAGE, CALCULATE  │
│ A PLURALITY OF DISTANCES FROM THE IMAGE SENSOR  │
│ TO DIFFERENT PORTIONS OF THE CALIBRATION SCENE  │──1140
│ USING TOF DATA DERIVED FROM THE MODULATED       │
│ LIGHT REFLECTED OFF THE CALIBRATION SCENE       │
└─────────────────────────────────────────────────┘
                        │
┌─────────────────────────────────────────────────┐
│ GENERATE A DISPARITY-CORRECTED INDIVIDUAL       │
│ CALIBRATION IMAGE BY RESAMPLING THE PORTIONS    │──1150
│ OF THE INDIVIDUAL CALIBRATION IMAGE ACCORDING   │
│ TO THE PLURALITY OF DISTANCES                   │
└─────────────────────────────────────────────────┘
                        │
┌─────────────────────────────────────────────────┐
│ GENERATE A NEW REFERENCE IMAGE BY COMBINING     │
│ MULTIPLE DISPARITY CORRECTED CALIBRATION        │──1160
│ IMAGES TAKEN AT MULTIPLE DIFFERENT DISTANCES    │
│ FROM THE CALIBRATION SCENE                      │
└─────────────────────────────────────────────────┘
```

*FIG. 11*

```
                                    ┌──────────────────────────────────────────────────────────┐
                              1200   │ EMIT STRUCTURED LIGHT TOWARDS A CALIBRATION SCENE        │
                                    │ FROM A STRUCTURED LIGHT EMITTER, THE STRUCTURED LIGHT    │ 1210
                                    │ COMPRISING A PLURALITY OF INDIVIDUAL EMITTED UNITS       │
                                    │ FORMING A STRUCTURED ARRANGEMENT                         │
                                    └──────────────────────────────────────────────────────────┘
```

FIG. 12

- 1210: EMIT STRUCTURED LIGHT TOWARDS A CALIBRATION SCENE FROM A STRUCTURED LIGHT EMITTER, THE STRUCTURED LIGHT COMPRISING A PLURALITY OF INDIVIDUAL EMITTED UNITS FORMING A STRUCTURED ARRANGEMENT

- 1220: EMIT MODULATED LIGHT TOWARDS THE CALIBRATION SCENE FROM A MODULATED LIGHT EMITTER, THE MODULATED LIGHT BEING MODULATED FOR MAKING TIME-OF-FLIGHT (TOF) DEPTH CALCULATIONS

- 1230: CAPTURE, THROUGH AN IMAGE SENSOR, A PLURALITY OF CALIBRATION IMAGES OF THE STRUCTURED LIGHT AND THE MODULATED LIGHT REFLECTED OFF THE CALIBRATION SCENE, THE IMAGES CAPTURED WITH THE IMAGE SENSOR AT MORE THAN ONE DEPTH FROM THE CALIBRATION SCENE

- 1240: CALCULATE A TOF Z-DEPTH FOR THE PLURALITY OF CALIBRATION IMAGES USING THE MODULATION OF THE REFLECTED MODULATED LIGHT DETECTED AT THE PORTION OF THE IMAGE SENSOR

- 1250: NORMALIZE THE PLURALITY OF CALIBRATION IMAGES TO A VIRTUAL DISTANCE BETWEEN THE CALIBRATION SURFACE AND THE IMAGE SENSOR, THE NORMALIZATION USING THE TOF DISTANCE BETWEEN THE SENSOR AND THE CALIBRATION SURFACE FOR EACH IMAGE, THE NORMALIZED CALIBRATION IMAGES COMPRISING DISPARITY CORRECTED UNITS

- 1260: TRACK INDIVIDUAL DISPARITY CORRECTED UNITS ACROSS MULTIPLE CALIBRATION IMAGES TO FORM A PLURALITY OF UNIT CLUSTERS

- 1270: CALCULATE AN AVERAGE X-Y COORDINATE FOR DISPARITY CORRECTED UNITS IN EACH CLUSTER

- 1280: GENERATE A NEW REFERENCE MODEL THAT CONSISTS OF THE AVERAGE X-Y COORDINATE FOR MULTIPLE CLUSTERS OF DISPARITY CORRECTED UNITS

FIELD CALIBRATION OF A STRUCTURED LIGHT RANGE-SENSOR

BACKGROUND

One of the features of machine vision systems can be the ability to recognize a scene and identify features and objects in the scene. Machine vision systems can be used in portable devices, such as head-mounted devices, on industrial robots, driverless cars, and other devices. Over time, the performance of such systems can degrade. The degradation can be difficult to detect so long as the vision system is still generating a depth image. For example, it is difficult to determine whether the assigned depths are accurate.

Different types of depth camera technology exist. Time-of-flight (TOF) can be used to produce range images at any distance, but suffers from errors due to multipath and other factors. Active triangulation/structured illumination is less prone to multipath but is more sensitive to mechanical changes and misalignment caused by temperature changes, physical mistreatment, and such.

Standard structured light sensors are calibrated once at the factory under carefully controlled conditions when developed. The structured light sensors can suffer performance problems if either the pattern or optics change over time (e.g., due to physical shock) and need to be recalibrated in order to accurately measure distance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein recalibrates a structured light sensor in the field using time-of-flight sensor data. Structured light sensors are sensitive to mechanical changes and misalignment caused by temperature and physical mistreatment in the field. These changes result in decreased accuracy. The in-field recalibration is completed without use of a complex calibration rig. Currently, structured light sensors are calibrated at the factory by a skilled technician or automated system using a complex calibration rig that locates the structured light sensor in a precise location relative to a target surface under highly controlled conditions. The calibration apparatus is not practical for a consumer to use or own because it is relatively large and expensive.

A structured light sensor comprises a light emitter and a camera. The light emitter illuminates a scene with structured light. The camera captures the structured light as it is reflected off the scene. For most static-pattern structured light sensors, the aim of the calibration process is to produce a reference image. The reference image typically is what the projected light pattern would look like on a flat object at a known distance, albeit other equivalent representations are possible. The range to an object is calculated by comparing the reference image to the actual image of the scene. This is possible because the projected pattern, as imaged by the sensor, is translated vs. the reference image as a function of z-distance to the object along an axis parallel to the baseline between the sensor and the light emitter. In some systems, the reference image is not explicitly stored, instead a model equivalent to or summarizing an explicit reference image is used. For example, if the reference image is composed of dots, then the reference image could potentially be summarized by a list of dot locations in the image. This is an example of a model of the reference image. In this patent, where we refer to a reference image, we include the possibility of a model of the reference image unless excluded—an implicit reference image, rather than an explicit reference image.

As the sensor optics change in response to environmental conditions, mechanical trauma, and such, the projected image can change. When the projected image changes, the reference image no longer matches the projected pattern. The calibration technology described herein captures a new reference image based on the current sensor characteristics.

By using a time-of-flight capable sensor as the structured light imaging sensor, a fixed mechanical setup is no longer required. Instead, the camera can be aimed at a wall, group of objects, or other calibration scene and a calibration performed, because the time-of-flight data can be used to calculate a range for the target object/scene.

BRIEF DESCRIPTION OF THE DRAWINGS

The technology described herein is illustrated by way of example and not limitation in the accompanying figures in which like reference numerals indicate similar elements and in which:

FIGS. 10-12 are flow diagrams showing methods of calibrating a structured light range sensor, in accordance with an aspect of the technology described herein.

DETAILED DESCRIPTION

Figure 1:
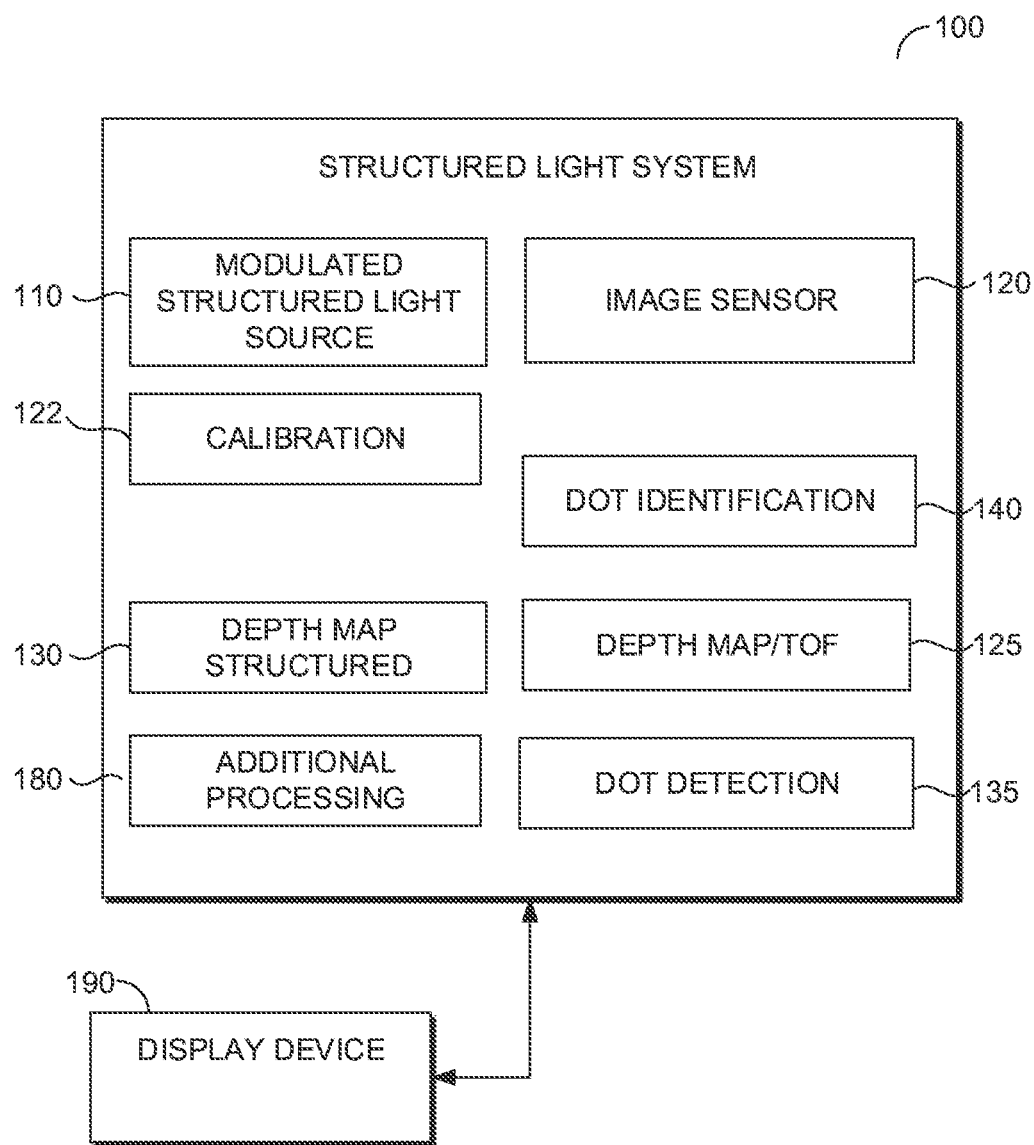
FIG. 1 is a block diagram of an example structured light system, in accordance with an aspect of the technology described herein.

The various technology described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. In some cases an explicit discussion of lens geometric distortion correction has been omitted, as various known methods can be applied.

The technology described herein recalibrates a structured light sensor in the field using time-of-flight sensor data. Structured light sensors are sensitive to mechanical changes and misalignment caused by temperature and physical mistreatment in the field. These changes result in decreased accuracy. The in-field recalibration is completed without use of a complex calibration rig. Currently, structured light sensors are calibrated at the factory by a skilled technician or automated system using a complex calibration rig that locates the structured light sensor in a precise location relative to a target surface under highly controlled conditions. The calibration apparatus is not practical for a consumer to use or own because it is relatively large and expensive.

A structured light sensor comprises a light emitter and a camera. The light emitter illuminates a scene with structured light. The camera captures the structured light as it is reflected off the scene. For most static-pattern structured light sensors, the aim of the calibration process is to produce a reference image. The reference image can be what the projected light pattern would look like on a flat object at a known distance, however, other equivalent representations are possible. The range to an object is calculated by comparing the reference image to the actual image of the scene. This is possible because the projected pattern, as imaged by the sensor, is translated vs. the reference image as a function of z-distance to the object along an axis parallel to the baseline between the sensor and the light emitter. In some systems, the reference image is not explicitly stored, instead a model equivalent to or summarizing an explicit reference image is used. For example, if the reference image is composed of dots, then the reference image could potentially be summarized by a list of dot locations in the image. This is an example of a model of the reference image. In this patent, where we refer to a reference image, we include the possibility of a model of the reference image unless excluded—an implicit reference image, rather than an explicit reference image.

As the sensor optics change in response to environmental conditions, mechanical trauma, and such, the projected image can change. When the projected image changes, the reference image no longer matches the projected pattern. The calibration technology described herein captures a new reference image based on the current sensor characteristics.

By using a time-of-flight capable sensor as the structured light imaging sensor, a fixed mechanical setup is no longer required. Instead, the camera can be aimed at a wall, group of objects, or other calibration scene and a calibration performed, because the time-of-flight data can be used to calculate a range for the target object/scene.

A structured light image is the reflection of a structured light pattern off objects in the scene. The depth map can be determined by capturing the structured light image and then using a triangulation method to determine a depth profile (i.e., depth map) based on the observed relative translation of known features of the structured illumination in the captured structured light image as scaled by the estimated baseline from the illuminator (light emitter) to the sensor.

In this discussion, a structured light image corresponds to an image derived in part from use of a structured light source. A structured light source corresponds to a light source or illumination source that projects a plurality of units (e.g., dots) arranged to form a pattern or structure. In some implementations, the light source for projecting a structured light image can be an infrared light source and/or another light source with reduced or minimized detectability in the visible spectrum. This can allow the structured light image to be projected onto an environment while having a reduced or minimized impact on images obtained using conventional visible light cameras (and/or other visible light detectors). The structured light image can then be captured using a corresponding camera (and/or other detector) suitable for detection of the type of light projected by the structured light source.

The units of the structured light image can correspond to any convenient type of reference pattern, so long as the reference pattern at any point in time is known at the time of calibration (such as predetermined). A depth map can be determined based on a structured light image by, for example, triangulation. One option for triangulation can be to have a known distance relationship between the structured light source and a single camera for capturing the structured light image. In this type of option, the known offset between the structured light source and the camera can be used in combination with a predetermined reference image projected by the structured light source to allow the light source to be used as a "virtual camera" for purposes of triangulation.

In various aspects, the number of units projected by a structured light source can be substantially smaller than the number of pixels used to represent an environment. As a result, the number of pixels illuminated by a dot from a structured light source can be substantially less than the total number of pixels. This can be in contrast to the light images projected by time-of-flight systems, where the projected illumination can correspond to continuous illumination or a "flood fill" that illuminates all or substantially all of the pixels in a view. For example, for a structured light image based on illumination from a structured light source, the number of pixels that are (at least partially) illuminated by a dot or unit can be 60% or less of the total number of pixels in the field of view corresponding to an environment. Expressed as a ratio, the number of pixels illuminated by a dot versus pixels not illuminated by a dot can be 1.5 or less (i.e., 60% or less of total pixels). More generally, the dots projected by a structured light source can correspond to having a ratio of illuminated pixels to non-illuminated pixels, in a reference direction suitable for defining the nature of a structured light image of the structured light source, of about 1.0 or less, or about 0.5 or less, or about 0.3 or less, or about 0.2 or less. In this discussion, pixels that are illuminated by a dot can be referred to as pixels that cover a dot and/or that are associated with a dot. It is further noted that the dots projected in the structured light image may have overlap with more than one pixel.

In aspects, the technology described herein outputs both a structured light and modulated light through a single light emitter. In this way, the modulated light does not flood the field, but instead follows a ratio consistent with a structured light system and each pixel may not receive modulated light.

The time-of-flight camera may be a phase modulation time-of-flight camera. It comprises a light emitter and an image sensor. The light emitter outputs modulated light. In an example, the source of modulated light may be an incoherent light source, which emits transmitted light that is modulated with a signal at a modulation frequency. In an example, the light from the device may be modulated rapidly, such that the amount of illumination changes periodically.

In a phase modulation system, the light emitter can output light at multiple modulation frequencies. The light emitter may be selected so that the wavelength of the emitted light is the most appropriate wavelength for a particular application. In an aspect, the light source may be selected to be a source of light of an appropriate wavelength for the application for which it is intended.

The light source may illuminate an object within the field of the camera and at least some of the light is reflected back toward the camera from the object. The reflected light may be detected by the image sensor. The reflected light is also modulated and the reflected light may be out of phase with the transmitted light due to the delay caused by the distance the light has traveled on the return trip between the sensor and the object. For each pixel of the image sensor, the amplitude and phase difference of the received signal relative to the transmitted light may be determined for each modulation frequency and used to calculate a depth for the pixel.

The calibration technology described herein will be described with reference to a static-pattern structured light sensor, however, the calibration can be used for other types of structured light sensors.

As used herein, a depth image may comprise a number of pixels with a depth value for each pixel. The depth value for each pixel corresponds with a distance between a point on an object in the scene being viewed by the depth camera and a reference position. In some cases, a depth value may not be returned for every pixel, because the illumination pattern does not emit light in that region of the scene or the scene is low reflectivity for the particular imaging wavelength used.

The following discussion will first describe the nature of the range-imaging system that is to be calibrated. The novel in-field calibration method is then described. There are two approaches to structured light range-imaging that can be calibrated using the technology described herein: one uses a completely arbitrary pattern and compares against a reference image, there other is a pattern composed of a plurality of units where the algorithm stores a reference model, comprising a list of unit locations in a reference image.

Arbitrary Pattern Approach

Any structured light algorithm that involves comparison of the captured image of a scene to a reference image may be used. One implementation takes the input image, performs contrast and dynamic range enhancement, corrects for geometric distortion by resampling the image and then applies a block matching algorithm to determine the disparity between the processed image and the reference image. This is typically performed by explicitly or implicitly testing how well regions of the processed image match the reference image by translating them in the direction parallel to the baseline between the illumination and the sensor and calculating a cost function, such as sum-squared-error. Other processing/cost functions may be included to speed up this process, perform only a partial search or to fill in missing data/ensure spatial contiguity. Once the best match/lowest cost function value has been determined, the disparity between the processed image and the reference image is known and Z-distance can be calculated as a function of the disparity by Z=c/DISPARITY. Where c is a constant that is typically a function of the baseline distance between the illumination and the imaging sensor and the focal length of the lens.

Unit Detection Approach

This approach relies on detecting units present in the illumination pattern and then tracking the units vs. a reference model, rather than block matching against a reference image. While there are many potential implementations, one particular implementation is given below.

Units in the captured image may be detected by any method known to those skilled in the art. For example, for units that are dots, a local contrast enhancement, thresholding and centroiding process may be applied in order to determine dot locations. Other techniques may use Laplacian of Gaussian filters, matched filters, deep neural networks, standard blob detection algorithms, machine learning or any other mathematical transformation capable of identifying the location of a unit. The location of each unit is determined and a correction is applied based upon the TOF so as to remove any translation/disparity introduced due to the baseline between the illuminator and the sensor. In addition to this, at any stage a correction may be applied for geometric distortion, either by resampling the original image or by performing a mathematical transformation of the estimated unit location in order to correct for the distortions introduced by the characteristics of the imaging lens/lenses. This process can be repeated for each dot or unit detected, until each unit is repositioned to form the TOF-adjusted structured light model. At this point, the corrected unit locations should match or closely approximate those in the reference model. The TOF-adjusted structured light model can then be used to identify each detected unit uniquely or near-uniquely. The TOF-adjusted structured light model can be a resampled image, a list of adjusted coordinates for units detected in the captured image or any other equivalent representation that encodes the image in a triangulation disparity corrected form. The adjusted coordinates can be used to identify units in the captured image uniquely or near-uniquely. The actual image or non-TOF-adjusted coordinates are used to calculate the structured light z-depth by calculating the disparity introduced along the axis of the sensor-illumination baseline. The TOF-adjusted structured light model is only used to identify detected units within an image. In one implementation of the technology described herein, each dot is uniquely identified without reference to any neighboring dots in the image by finding the best matching dot in a list of dots or in a reference image in the TOF-adjusted representation. In another implementation, the neighboring dots in either the reference image or the real image are used to assist in identification using their relative locations in the structured light image, the TOF structured light image, or any other parameters calculable from the available data, such as relative intensity of the dots. In one particular variant, the N-nearest matches in the reference image are found and a search is performed by finding the match for each pixel, which minimizes the Lp norm of the difference in Z between the dot and its M-nearest neighbors in the original image. Additional thresholds on the relationship between the TOF data and the estimated range from triangulation or other parameters may be applied at any stage. For example, in one implementation, only dots which correspond to range-from-triangulation values that are very near to the TOF deduced range value or closer than the TOF deduced range value are considered to be valid matches, thus reducing the search space and computational complexity. Implementations may use a wide variety of data structures in order to enable fast identification of specific corresponding dots in the reference image, such as quad-trees or decision trees. In some implementations, machine-learning techniques, such as neural networks may be used to accelerate dot identification for either a dot in isolation or over a group of neighboring dots.

Once the identity of each dot has been determined, the structured light z-depth can be calculated. In one implementation of the technology described herein, the structured light z-depth is calculated by Z_STRUCTURE=c/(X_DOT−X_REF), where X_REF is the x-location of the TOF corrected reference at infinity (the dot that X_ADJUSTED value enables us to determine) and Z_STRUCTURE is the determined structured light z-depth.

In some implementations, the structure z-depth data is further denoised/enhanced using the range measurements from TOF. Denoising can improve the image quality subjectively or objectively. The denoise/enhance process may take the form of dynamically determined weights for the purposes of averaging, based upon the difference in z-distance or radial distance between adjacent dots or any other approach that uses features/data from TOF to improve the subjective or objective quality of the structure z-depth image. A specific example is a bilateral filter, where the weights are based upon TOF range data but applied to the z-data generated from structure. A similar filter could be implemented for a sparse image by performing a weighted average of the N-nearest detected dots, either in 3D space or in image space. Some of these filters may also be applied solely using the structure z-depth, without further use of TOF data.

Calibration Process

The calibration process for both types of structured light sensor is quite similar. Initially, the user aims the range-imaging system at a scene and moves the camera around, so that each pixel in the camera integrates light from a plurality of ranges. As the camera is moved around the scene, the camera simultaneously or near simultaneously captures a stream of images that contain both range data and the structured illumination pattern. In the simplest implementation, the reference model or reference image is estimated by performing geometric distortion correction, then reversing the triangulation induced disparity using TOF depth, then combining these estimates from different camera locations so as to reduce noise and ensure that there are no missing regions of the reference image/model. Depending on the ranges and reflectivities in the scene imaged by the camera, a single image is not enough to reconstruct the full reference image/model, as not all of the projected pattern may be imaged by the imaging sensor due to occlusion in the scene, and there may be significant noise present in a single image. The estimates of the reference image model from the different images of the scene are combined in order to generate a final reference image.

A number of systematic errors may be corrected for in the case of reference image estimation, including the 1/range^2 drop off in the intensity of the active illumination due to the fundamental physical properties of the propagation of light. This means that even if the brightness of the pattern is consistent across the field-of-illumination on a constant reflectivity flat surface at a distance of 1 meter, if part of the scene is at 2 meters from the camera and another part is at 1 meter, then given homogenous scene intensity the part of the scene at 2 meters will be one quarter the brightness of the part of the scene at 1 meter. In some implementations this correction may be achieved by converting intensity into a common distance representation, by multiplying pixels or regions of the image intensity by a value proportional to range^2. In some implementations, correction for the relative illumination of the sensor, or known or inferred reflectivity may also be applied. In one implementation, the camera calibration is performed by generating a series of these systematic error corrected images and then calculating the mean on a per-pixel basis. In other implementations the median, a weighted average or any other mathematical method of combining the systematic error corrected images on a per-pixel basis may be used.

In one implementation the raw input image is resampled to correct for triangulation induced disparity, then a local contrast enhancement is performed in order to correct for drop-off in the intensity of the active illumination with range, unknown reflectivity, relative illumination and other factors. Any algorithms capable of achieving a standard contrast across the image may be applied, one implementation is to convolve the triangulation corrected image with an 11×11 box filter. The triangulation corrected image is divided by the convolved image in order to produce an image with consistent contrast. This is just one example, and other implementations are possible. In one implementation, the camera calibration is performed by generating a series of these contrast corrected images and then calculating the mean on a per-pixel basis. In other implementations the median, a weighted average or any other mathematical method of combining the contrast corrected images on a per-pixel basis may be used.

In some implementations a reference image generated by the above processes may be further processed to generate a reference model.

Specialized Reference Model Implementation

One implementation of the invention in the case of a reference model of units present in the projection pattern tracks the unit centroid or location as the camera is moved within the scene and combines it with TOF data in order to estimate the location the unit would be in at an arbitrary distance, for example infinity.

Units may be detected by various methods. For example, for units that are dots, a local contrast enhancement, thresholding and centroiding process may be applied in order to determine dot locations. Other techniques may use Laplacian of Gaussian filters, matched filters, deep neural networks, standard blob detection algorithms from the literature, machine learning or any other mathematical transformation capable of identifying the location of a unit.

As the camera is moved around the scene, the camera simultaneously captures a stream of images that contain both range data and the structured illumination pattern. The camera is moved sufficiently slowly and the frame rate is sufficiently high that the units are tracked across frames by comparing the detected locations in adjacent frames, for example using a least squares metric. As each individual dot is tracked over time, it traces out a curved path that encodes information about the geometric distortion properties of the lens. If the tracking is carried out after geometric distortion correction has been applied to the image or the dot location itself, then the dot traces out a line in the direction of the baseline between the imaging sensor and the illuminator, due to the impact of triangulation. If the dot location is corrected for triangulation induced disparity, then the triangulation and geometric distortion corrected dot locations form a cluster. These clusters consist of noisy measurements of the unit location in the reference model and the reference model is calculated by combining these, in some implementations this is achieved via taking the mean, or the median, or a weighted mean, or any other method of producing a value representative of the cluster location. This is explained in greater detail, with reference to figures, later in this document. This particular reference model is one type of calibration achievable by the disclosed method.

In some implementations the geometric distortion parameters of the lens are known, but the baseline is not known and therefore the function describing how to correct for triangulation induced disparity is unknown. In this case, the tracked dots form lines. Using TOF information, adjusted dot locations can be calculated using the equation $$X\_ADJUSTED=X\_DOT-c/Z\_TOF$$

Where c is a constant that is typically a function of the baseline distance between the illumination and the imaging sensor and the focal length of the lens, and X_DOT is the non-TOF-corrected X location of the dot, Z_TOF is the Z-distance calculated via TOF. The above equation assumes that the imaging sensor and the light emitter are located in a side-by-side arrangement next to each other along the x-axis, in which case Y_ADJUSTED=Y_DOT. If the camera and emitter are arranged along the y-axis, then the disparity would be along the y-axis, it is also possible to have an arbitrary rotation in which there may be two values of c, one for X and one for Y etc. For any value of c, a cost function can be formed representing the spread of the cluster of dots locations for each dot, in some implementations this may be the sum of the variance of X_ADJUSTED and Y_ADJUSTED over all the dot locations for each dot e.g.

$$\text{Cost}=\Sigma_{d \in DOTS}(\sigma_{X_{d,ADJUSTED}}^2+\sigma_{Y_{d,ADJUSTED}}^2)$$

Where DOTS is the set of all dots, d is a specific dot, $\sigma_{X_{d,ADJUSTED}}^2$ is the variance of the X_ADJUSTED values for dot d and $\sigma_{Y_{d,ADJUSTED}}^2$ is the variance of the Y_ADJUSTED values for dot d. Any cost function may be used, including least squares, mean absolute error/variation and other mathematical functions, so long as the cost function is designed to cluster the adjusted dot locations as closely as possible. Any algorithm can then be applied to the cost function that minimizes the cost function. For example, Newtons Method is a standard optimization approach, but we include any algorithm known to those skilled in the art, including Nelder-Mead. Maximizing a cost function where large values correspond to greater clustering is also another implementation. Any subset of dots or dot position information may be used.

An additional implementation is to form the cost function in such a way that there is a direct inverse, without a numerical optimization operation. One implementation for the case of a baseline perfectly oriented along the x-axis is $$c = \frac{\sum_{d \in DOTS}(nx_d^T v_d + x_d^T J_n v_d)}{\sum_{d \in DOTS}(nv_d^T v_d + v_d^T J_n v_d)}$$

Where n is the number of positions for each dot, $x_d$ is a vertical vector of the non-TOF-corrected dot locations for dot d, $v_d$ is a vertical vector of the reciprocals of the TOF estimated Z-distance for each of the positions for dot d or a mathematically equivalent/similar value, and $J_n$ is an n×n matrix of ones.

In one implementation, once c is known, TOF corrected dot cluster locations are used as a reference model in combination with c by a structured light range imager in order to determine range.

In some implementations, the geometric distortion parameters may be unknown and determined by the calibration method. This may be in the case where the baseline is either know or unknown. In these implementations the geometric distortion parameters are estimated by minimizing the size of the cluster of transformed dot positions for each dot in a similar manner to the above approach for baseline determination, but with an additional transformation and parameters to be optimized for. In one implementation, where the baseline has an arbitrary orientation, the X_ADJUSTED and Y_ADJUSTED values are calculated by $$X\_ADJUSTED=f\_x(X\_RAW,Y\_RAW,GEOMETRIC\_PARAMETERS)-c\_x/Z\_TOF$$

$$Y\_ADJUSTED=f\_y(X\_RAW,Y\_RAW,GEOMETRIC\_PARAMETERS)-c\_y/Z\_TOF$$

Where f_x(X_RAW, Y_RAW, GEOMETRIC_PARAMETERS) is a function that takes the raw X and Y location of a dot in the image (X_RAW, Y_RAW) and uses the current estimate of the geometric parameters of the lens to calculate an estimate of the X location as if the lens did not suffer from any geometric distortion and f_y(X_RAW, Y_RAW, GEOMETRIC_PARAMETERS) is a function that calculates an estimate of the Y location as if the lens did not suffer from any geometric distortion.

The functions f_x and f_y are implemented as computer code and may correspond to direct implementation of a mathematical formula, or a more complicated look-up table or the solution of an optimization problem themselves, or any realizable implementation that produces estimates of the true undistorted x and y locations, including standard geometric or radial distortion models from the literature and arbitrary polynomial or rational functions. One implementation of f_x and f_y is $$f\_distort(r)=(1+kappa\_1*r+kappa\_2*r^2)/(1+kappa\_3*r+kappa\_4*r^2+kappa\_5*r^3)$$

$$f\_x(X\_RAW,Y\_RAW,GEOMETRIC\_PARAMETERS)=X\_C+(X\_RAW-X\_C)*f\_distort(sqrt((X\_RAW-X\_C)^2+(Y\_RAW-Y\_C)^2))$$

$$f\_y(X\_RAW,Y\_RAW,GEOMETRIC\_PARAMETERS)=Y\_C+(Y\_RAW-Y\_C)*f\_distort(sqrt((X\_RAW-X\_C)^2+(Y\_RAW-Y\_C)^2))$$

Where f_distort(r) is an intermediate function that calculates the amount of radial distortion correction given the distance from the center of distortion, r, and a list of distortion parameters kappa_1, kappa_2, kappa_3, kappa_4, kappa_5. Sqrt( ) is a function that takes the square root of a value, ^ indicates an exponentiation operation. X_C and Y_C are parameters that indicate the centre of distortion in pixel coordinates. In this particular implementation, GEOMETRIC_PARAMETERS is considered to be a tuple comprised of X_C, Y_C, kappa_1, kappa_2, kappa_3, kappa_4 and kappa_5.

For any values of c_x, c_y and GEOMETRIC_PARAMETERS, a cost function can be formed representing the spread of the cluster of transformed dot locations, where the cost function measures the degree of concentration in one location, any function or approximation with this property may be applied, such as mean absolute distance from the mean, in some implementations this may be the sum of the variance of X_ADJUSTED and Y_ADJUSTED over all the dot locations for each dot e.g.

$$\text{Cost}=\Sigma_{d \in DOTS}(\sigma_{X_{d,ADJUSTED}}^2+\sigma_{Y_{d,ADJUSTED}}^2)$$

Where DOTS is the set of all dots, d is a specific dot, $\sigma_{X_{d,ADJUSTED}}^2$ is the variance of the X_ADJUSTED values for dot d and $\sigma_{Y_{d,ADJUSTED}}^2$ is the variance of the Y_ADJUSTED values for dot d. Any cost function may be used, including least squares, mean absolute error/variation and other mathematical functions, so long as the cost function is designed to cluster the adjusted dot locations as closely as possible.

Optimization is then performed over the cost function in order to determine c_x, c_y and GEOMETRIC_PARAMETERS either simultaneously or sequentially, where kappa_1, kappa_2 etc. estimation may potentially also be performed sequentially. This may use any suitable optimization approach known to those skilled in the art, including numerical methods such as Newton's Method, arbitrary regularization approaches and more advanced methods such as genetic algorithms In some implementations direct equations may be used to calculate the geometric model parameters or c_x, c_y instead of explicit numerical optimization. In one implementation Nelder-Mead is used. The output of the optimization is a reference model containing all the undistorted dot cluster centers with TOF z-distance correction, as well as lens geometric parameters and illumination-sensor baseline calibration, which are used as inputs to a structured illumination ranger, or similar system. Variants are possible where some subset of the parameters are fixed or determined by other methods and only a subset of the parameters are optimized over.

FIG. 1 schematically represents an example of a structured light system 100 suitable for determining a depth map from a structured light image. The system shown in FIG. 1 includes a modulated structured light source 110 for projecting a structured light image onto a scene or environment where the projected light is also modulated. In an aspect, the structured light system 100 can have only a single light source and single imaging system. Camera or image sensor 120 can be used to capture the projected structured light image. The captured structured light image can then be processed by one or more components of FIG. 1 in order to generate a depth map or a new reference image. The components shown in FIG. 1 can be implemented, for example, using a processing unit with associated memory that executes computer-executable instructions. More generally, the components shown in FIG. 1 can be implemented using any convenient combination of hardware, firmware, and/or software. For convenience, a plurality of separate components are shown in FIG. 1, but it is understood that these components can be combined and/or split in any convenient manner. The components can include a TOF-depth map calculation component 125, a structured-light depth-map calculation component 130, a dot detection component 135, a dot identification component 140, and a calibration component 122.

Additionally, FIG. 1 shows an additional processing component 180 for performing additional processing based on a depth map. Additional processing component 180 can, for example, correspond to a texture mapping and rendering component. The output from such an additional processing component 180 could be displayed to a user via a display device 190. The display device could correspond to a conventional stand-alone video display, an augmented reality headset (i.e., a head-mounted display device), a display screen on a mobile computing device, a display screen associated with another computing device, and/or any other convenient display device.

The modulated structured light source 110 comprises a light emitter that outputs structured light that is also modulated light. In an example, the source of modulated light may be an incoherent light source, which emits transmitted light that is modulated with a signal at a modulation frequency. In an example, the light from the device may be modulated rapidly, such that the amount of illumination changes periodically. In a phase modulation system, the light emitter can output light at multiple modulation frequencies. The light emitter may be selected so that the wavelength of the emitted light is the most appropriate wavelength for a particular application. In an aspect, the light source may be selected to be a source of light of an appropriate wavelength for the application for which it is intended. As explained, the modulated light is given a structural arrangement of units that can be organized in a repeating pattern, such as in a grid, or randomized. In FIG. 1, the unit is described as a dot, but other shapes may be used.

Image sensor 120 includes a physical light sensor that can be used to capture the projected structured light image. The image sensor 120 can include software and hardware to generate a digital image of the captured light. The image sensor 120 includes a sensor that can determine a frequency of the received light to be used in a TOF depth determination.

Figure 3:
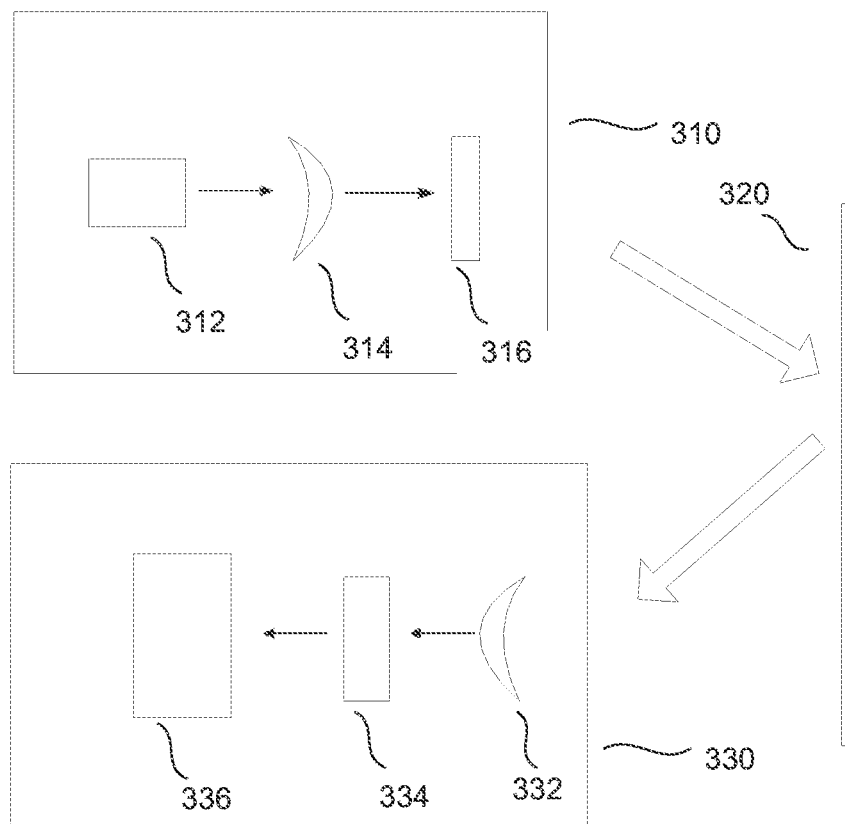
FIG. 3 is a block diagram of an example structured light system, in accordance with an aspect of the technology described herein.

The image sensor 120 and light emitter 110 can take the form of the system shown in FIG. 3. FIG. 3 schematically represents a structured light source 310 and an imaging system 330 that can be used to capture a structured light image. In aspects, the structured light source 310 and imaging system 330 can be part of a single system. In the example of a structured light source shown in FIG. 3, structured light source 310 includes a laser diode 312 (or optionally one or more laser diodes 312), such as a single mode laser diode, for generating modulated light. In one aspect, the laser is a 2.4 W single mode, multi-emitter laser. Other emitters may be used with the technology described herein, such as LEDs, VCSELs or single-mode, single emitter lasers. Light from laser diode 312 can then pass through a collimating optic element 314 to provide (substantially) collimated light. The collimated light can then pass through a diffractive optic element 316 to generate light corresponding to a structured light source pattern.

The light from structured light source 310 can be used to project the structured light source pattern onto a view or scene to form a structured light image. The view or scene is schematically represented by surface 320. The structured light image can then be captured by imaging system 330. In the example shown in FIG. 3, imaging system 330 can include an imaging lens 332, one or more filters 334 (such as an IR bandpass filter), and a sensor 336. In one aspect, the imaging sensor has 512×424 usable pixels and is configured with ~35×29 degree field of view, with 8 mm focal length @ f/2.0. Aspects are not limited to this imaging sensor.

Figure 4:
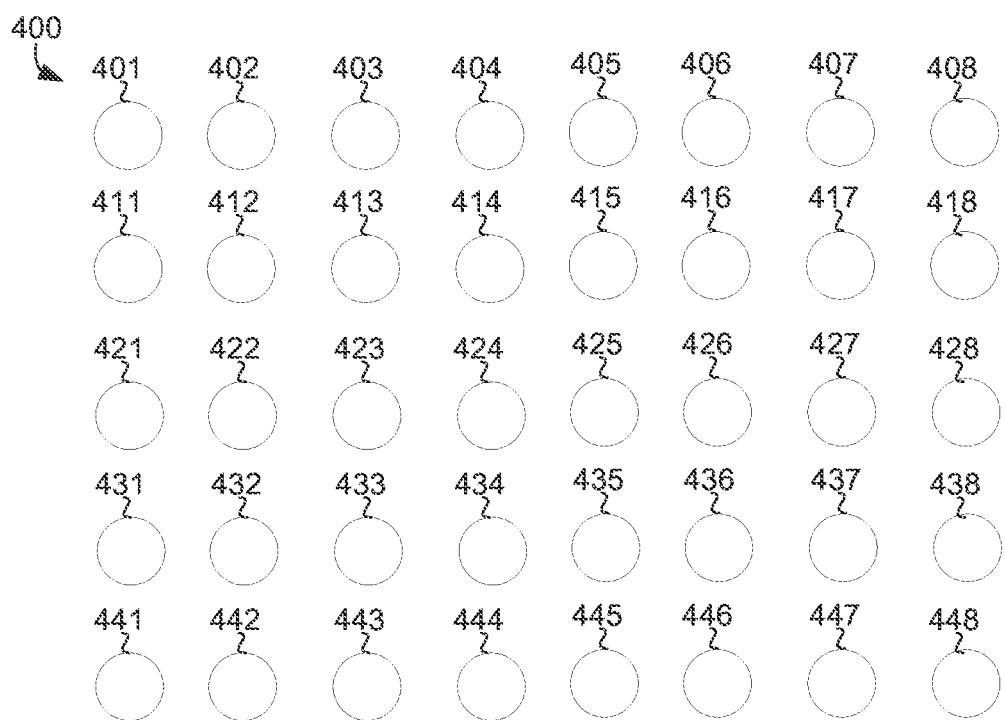
FIG. 4 is a diagram depicting structured illumination reflected off a flat surface, in accordance with an aspect of the technology described herein.

Turning now to FIG. 4, a graphic representation 400 of a reflected structured light image is depicted. The graphic representation 400 represents just a portion of a possible real-world structured light image. An actual structured light image might have many more rows and columns of dots than depicted. Aspects are not limited to a structured light image comprising dots or a grid pattern. Other types of graphical units can be arranged into any number of patterns, including both organized patterns and randomized.

The orderly arrangement of units within the reflected structured light image depicted could be generated by capturing structured light reflected off a relatively flat surface because the reflection maintains a similar arrangement as the projected light. As can be seen, the dots are arranged in evenly spaced rows and columns that largely match the projected structure. The first row of dots comprises dots 401, 402, 403, 404, 405, 406, 407, and 408. The second row of dots comprises dots 411, 412, 413, 414, 415, 416, 417, and 418. The third row of dots comprises dots 421, 422, 423,

424, 425, 426, 427, and 428. The fourth row of dots comprises dots 431, 432, 433, 434, 435, 436, 437, and 438. The fifth row of dots comprises dots 441, 442, 443, 444, 445, 446, 447, and 448.

In aspects of the technology described herein, the reflected light forming each dot can be analyzed to determine a TOF depth for the dot. As mentioned, the TOF depth is calculated by determining the elapsed time taken for the projected light to reflect off an object in the scene and be captured by the imaging sensor.

The TOF depth for each dot can then be used to match the dot in the captured image to a corresponding dot in the reference image or reference model. Once dots are identified within the captured image, a distance between the captured dot and the projected dot can be determined using a known offset between the light emitter in the image sensor. The distance between these corresponding dots can be used as part of a triangulation calculation to determine a structured light depth for the dot. In this way, each dot in the captured image can be assigned a structured light depth. Other implementations may not use TOF during ranging operation and only use TOF range information during calibration.

Returning to FIG. 2, a dot detection component 135 analyzes the image captured by the image system 120 to detect dots within the image. As mentioned, the light is emitted in a pattern. An analysis is performed to determine which emitted units correspond to captured units in the image. A first step in dot detection can be to isolate light by frequency within the calibration image to focus the analysis on image content within a frequency corresponding to the emitted light.

Even within the relevant light frequency, the image can include noise and other content that are not dots. Units, described as dots herein, can be identified by obtaining a binary segmentation of the image such that each pixel is classified as (1) covering a dot or (2) not covering a dot. A pixel covering a dot can also be referred to as a pixel associated with a dot.

Determining whether a pixel is associated with a dot can also include determining an intensity profile based on the intensities for each detected dot. With regard to detecting the presence (or absence) of a dot at a pixel, a variety of strategies can be available. One option can be to perform thresholding based on a global threshold value. If the detected intensity at a pixel is greater than the global threshold value, then the pixel is considered to be associated with a dot. Another option is to perform local or adaptive thresholding for feature detection. Once the dots are isolated from noise in the reflected image, and therefore detected, the dots can be identified.

A dot identification component 140 attempts to identify a correspondence between detected dots in the image with projected dots. In an aspect, each unit in the projected image is assigned a unique identification corresponding to an identified unit in the projected image. As the calibration image is taken from an image projected off a flat surface, the orientation and arrangements of dots in the projection should match those in the image.

A TOF-depth map calculation component 125 uses the frequency of the received light to calculate a TOF z-depth for each unit (e.g., dot) identified by the dot identification component 140.

A structured-light depth-map calculation component 130 uses the distance between the emitted light and a dot to determine the depth of an object in the scene using triangulation, as explained in more detail elsewhere.

The calibration component 122 generates a new reference image, or confirms the existing reference image is accurate, according to the technology described herein. In one aspect, a new reference image is generated from calibration images capturing two objects separated by a distance. In another aspect, the new reference image is generated from calibration images of a single flat surface, such as a wall.

Initially, a plurality of calibration images are captured. The calibration images capture both structured light and modulated light. The calibration images capture a three-dimensional scene comprising two objects at different ranges. The plurality of calibration images can be captured with the sensor in a different location. The eventual new reference image can be calculated by averaging, or otherwise combining, analysis of the several calibration images.

For simplicity, the following discussion proceeds as if the imaging optics were not subject to radial distortion, such as pincushion or barrel distortion, however, distortion correction can be utilized in many implementations. In some implementations, optics with minimal radial distortion are used, in other implementations the image may be explicitly resampled/rectified to correct for radial distortion. In another implementation, the x and y image coordinates of each dot are converted into a radial distortion corrected representation before further operations are carried out on the x and y image location values. Any further reference to x or y dot location could be considered to apply to either distortion corrected or uncorrected values depending on the implementation.

Figure 7:
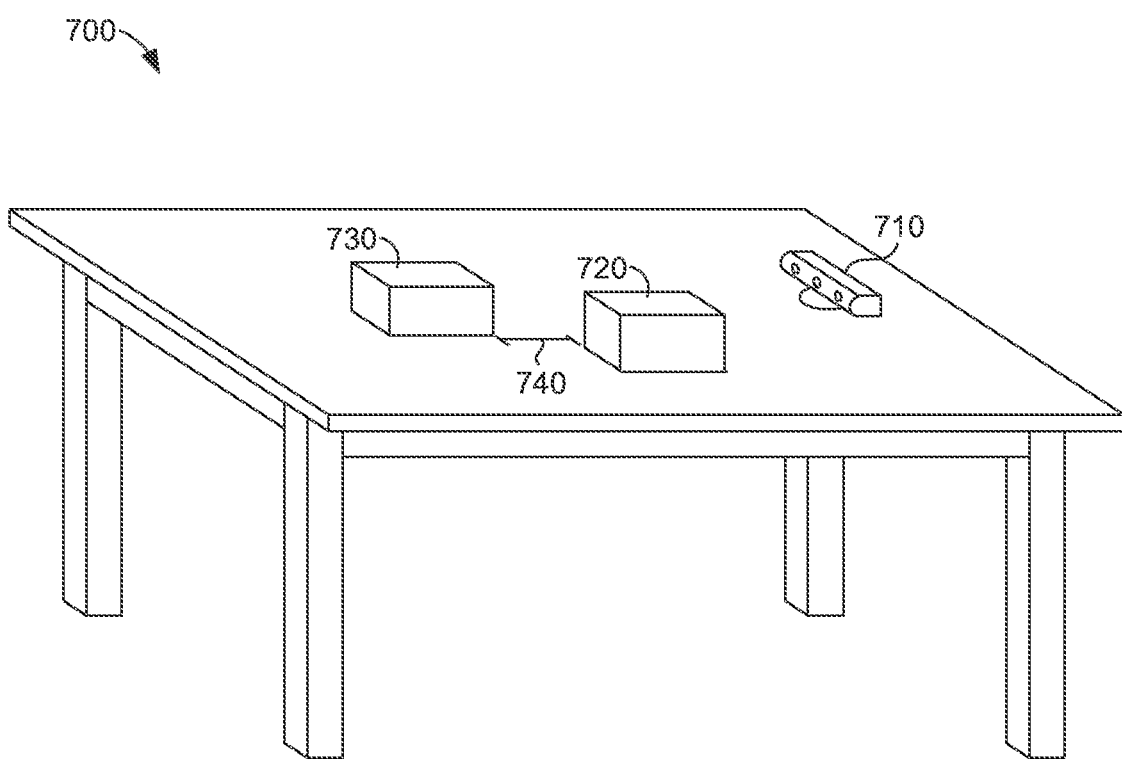
FIG. 7 is a diagram depicting a field calibration environment, in accordance with an aspect of the technology described herein.

FIG. 7 shows a suitable calibration environment 700. The calibration environment includes a range sensor 710 oriented towards a first box 720 and a second box 730. The two boxes are separated by a distance 740, thereby presenting planar surfaces at two distances from the sensor 710. The two boxes present a substantially flat surface that is substantially orthogonal to an imaginary line of sight extending from the camera. Other sources of flat surfaces may be used instead of boxes. In one instance, a single box against a wall is used with the wall forming one surface and the box side forming the other. In some implementations no flat surface is required, any surface can be used.

Figure 8:
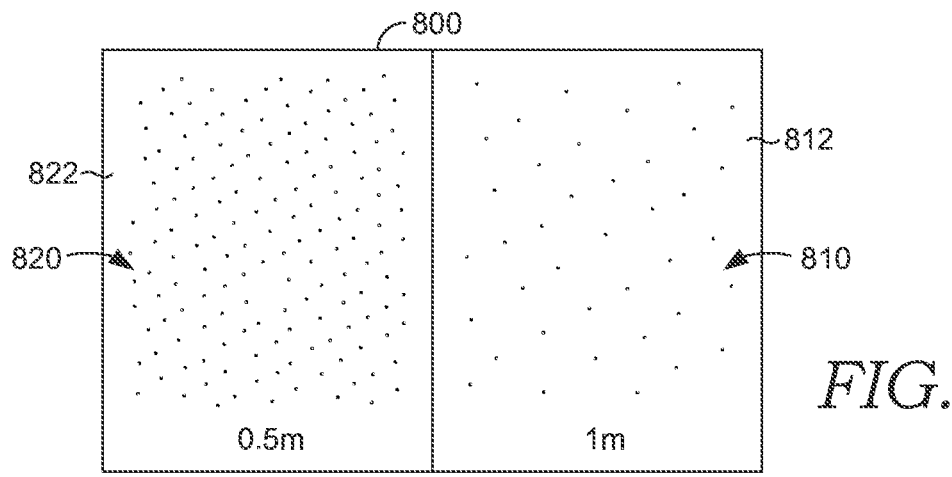
FIG. 8 is a diagram depicting a calibration image captured by a sensor viewing the field calibration environment, in accordance with an aspect of the technology described herein.

The calibration scene is illuminated by the pattern projector in the sensor 710 and an image, such as the calibration image 800 in FIG. 8, is taken. The calibration image 800 depicts an image of the illumination reflected off the two box faces. The left half 820 of the calibration image 800 depicts the pattern reflected off a box face that is half a meter from the sensor 710. The right half 810 of the image 800 captures a reflection of the projected image off a surface that is a meter from the sensor 710. Aspects of the technology are not limited to these distances. One meter and 0.5 meters are just example distances. The distances to the two surfaces can be calculated using TOF data for the captured images. Given that the disparity (i.e., horizontal movement of the illuminated light) introduced by distance from the camera to an object is proportional to 1/distance, an estimate of the hypothetical appearance of the projected image at infinity for a camera with no geometric distortion can be estimated. The difference in appearance between the left pattern 822 and right pattern 812 is intended to illustrate an intensity difference in the pixels. Intensity of the pattern decreases with distance traveled. The intensity difference can be adjusted, as described subsequently.

Figure 9:
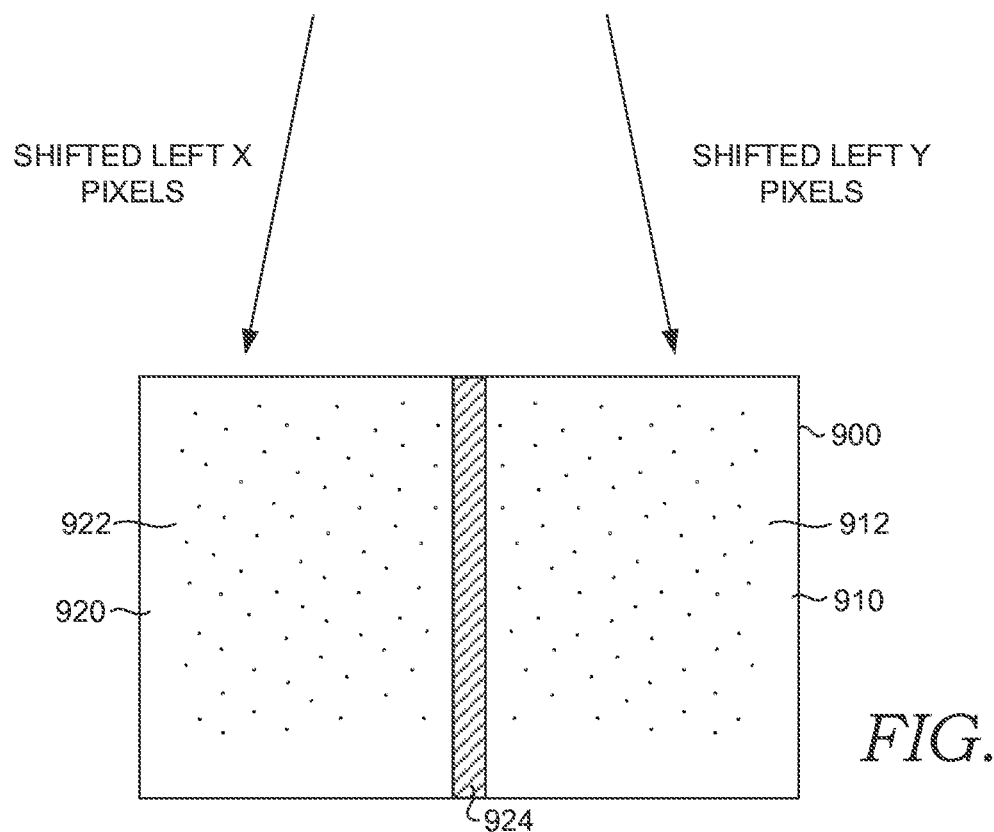
FIG. 9 is a diagram depicting an adjusted calibration image, in accordance with an aspect of the technology described herein.

The image in FIG. 9 is an estimated reference image 900. The estimated reference image is created by adjusting the captured illumination pattern in the calibration image to a reference distance. The portion of the calibration image 800 showing the reflection 822 of the projected pattern off the object at 0.5 meters has been shifted by 10 pixels to the left forming the left portion 920 of the calculated reference pattern 922. The pixels are shifted to the left to compensate for the disparity introduced by the illumination baseline, which is the distance between the projector and image sensor 710. The reflection 812 of the projected pattern off the object at one meter is shifted by half this (due to 1/d), giving a 5 pixel shift to the left. This leaves a gap 924 of five pixel's width between the left half 920 and right half 910 of image 900. The gap means that the entire reference image cannot necessarily be reconstructed from a single image of the scene.

The pixel shift along the x axis can be calculated using:

$$X\_ADJUSTED = X\_DOT - c/Z\_TOF$$

Where c is a constant that is typically a function of the baseline distance between the illumination and the imaging sensor and the focal length of the lens. The above equation assumes that the imaging sensor and the light emitter are located in a side-by-side arrangement next to each other along the x-axis. If the camera and emitter are arranged along the y-axis, then the disparity would be along the y-axis.

In an aspect, the image 900 is scaled to correct for 1/distance^2 illumination drop-off. As the illumination from the sensor 710 spreads out it becomes progressively weaker. Using the TOF range information, a z-distance for each pixel containing a light unit is calculated. This distance is used as a scaling factor and applied to each pixel in the reference image to generate a corrected pixel intensity. The scaling factor is applied by multiplying the pixel intensity by the TOF distance squared.

In one aspect, the final reference image model is an average of a number of these estimated reference images. Each estimated reference image can be calculated by moving the sensor 710 to a different location. Other implementations use a consistency metric, median, or other image/signal processing algorithms to combine the estimated reference images into a replacement reference image.

In one aspect, the replacement reference image is compared to the original reference image. The original reference image may be replaced if the difference between the two images exceeds a threshold difference.

The calibration component 122 can also perform calibration using images of a single plane taken at different distances. In an aspect, the calibration images are captured as a user moves the sensor towards and away from a largely multi-path free surface, such as a wall. In one aspect, the user puts the device in calibration mode. The device may output calibration instructions for the user to follow. If the device has a graphical user interface, or is coupled to one, then instructions can comprise an animation of a person moving the device towards and then away from a surface. The movement can be generally perpendicular to the viewing surface.

In one aspect, the reference model used directly by the algorithm is not an image at a particular known distance, it is a list of dot locations in the image at a known distance. The projection pattern is assumed to be composed of dots or some sort of markers. As the system is moved around, the dots are tracked. When the correct baseline and geometric distortion parameters are known, the dot locations in the reference model can be calculated. Each frame gives a new estimate of the dot locations: these estimates can be combined so as to remove any residual error. Also, some dots are only visible in certain frames, as with the generic image case.

Figure 5A:
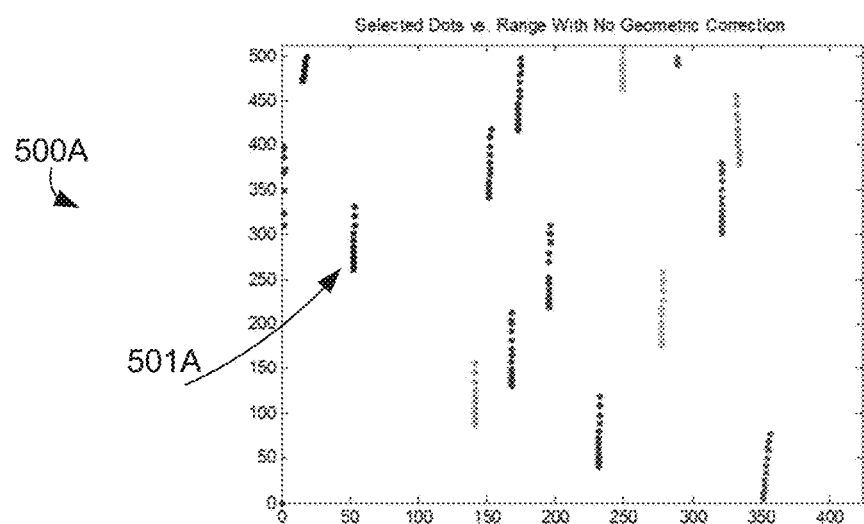
FIGS. 5A and 5B, in accordance with an aspect of the technology described herein.

The calibration method is described in more detail with reference FIGS. 10 and 12. Initially, multiple calibration images taken at different distances can be combined and the units shown. FIG. 5A shows a portion of identified dots combined in a single image from multiple calibration images. Each string of dots, such as string 501A, represent a single dot identified in multiple calibration images. The different dots move from image-to-image because images are taken at different depths. Interference and other abnormalities can prevent a dot from being identified in each frame or image.

Figure 5B:
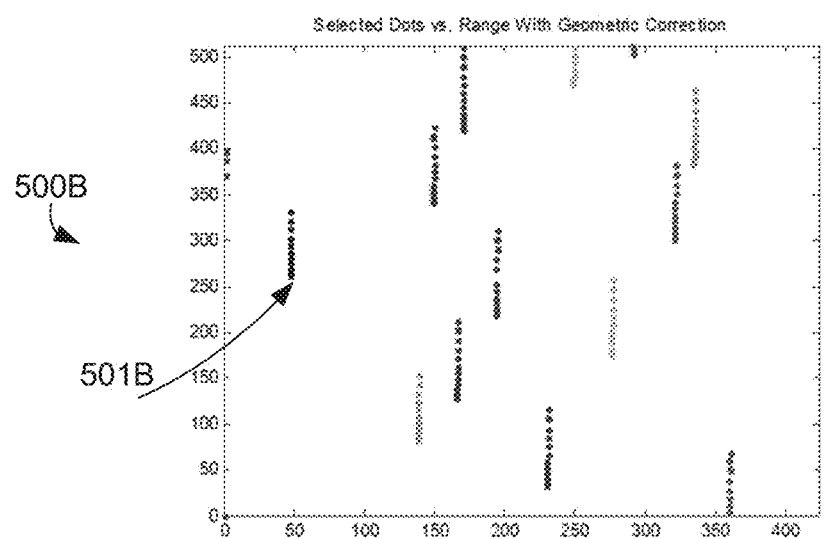

Different corrections can be made in some aspects, for example, FIG. 5B shows the same series of dots, except corrected for geometric distortion. In some aspects, the correct geometric distortion needs to be determined before corrections can be made.

Figure 6:
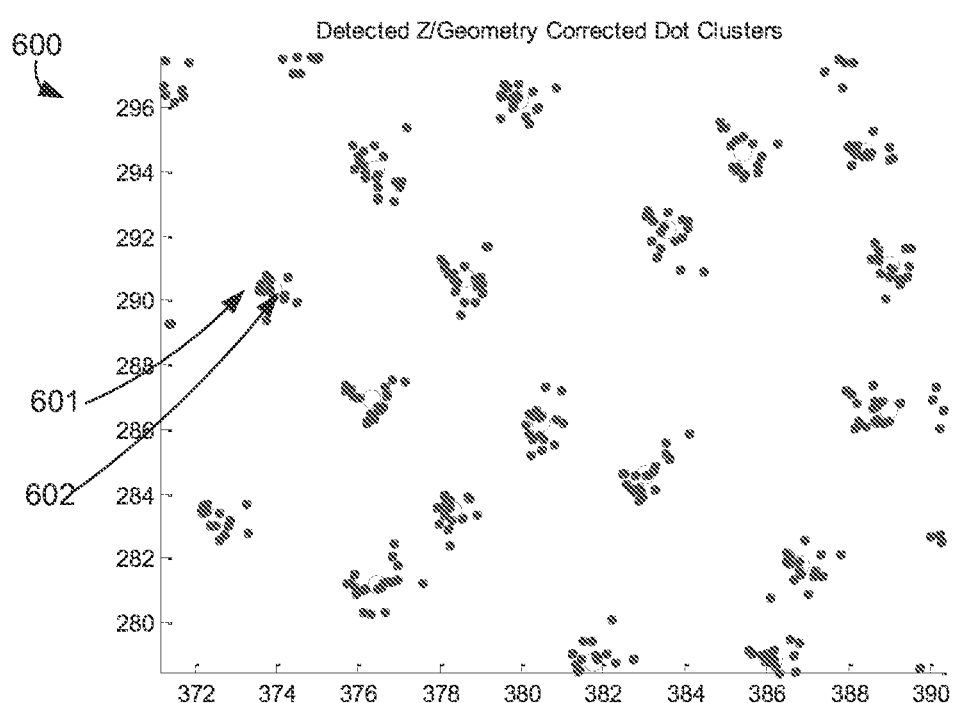
FIG. 6 is a diagram depicting a TOF depth adjusted structured light image, in accordance with an aspect of the technology described herein.

Once corrections are made, the units can be depth corrected using TOF data. This can also be described as normalization to a single depth. In essence, the dots are relocated in the x-y plane according to the z-depth. In a theory, the dots should all have exactly the same x-y coordinates. In reality, the dots will form a cluster with slightly different coordinates, as is shown in FIG. 6. For example, cluster 601 represents depth corrected dots taken at different distances. The average x-y coordinate 602 can be used as the location for the dot in the new reference image.

In some instances, the baseline or geometric distortion parameters are misestimated or unknown. The dots are tracked across time to back out to determine the baseline and the geometric distortion. For the correct baseline and geometric distortion parameters, the estimates of the dot reference model for each frame should be very consistent (giving clear clusters of dot locations). If there are errors in the parameters, then the dot location is not consistent in the estimated reference model. By expressing a cost function for the denseness of the cluster of estimates for each dot in the reference model, the baseline and geometric distortion parameters can be determined via optimization or a standard inverse problem algorithm. The cost function may be standard deviation of the location or mean absolute deviation. Additional details have been previously described above.

Figure 2:
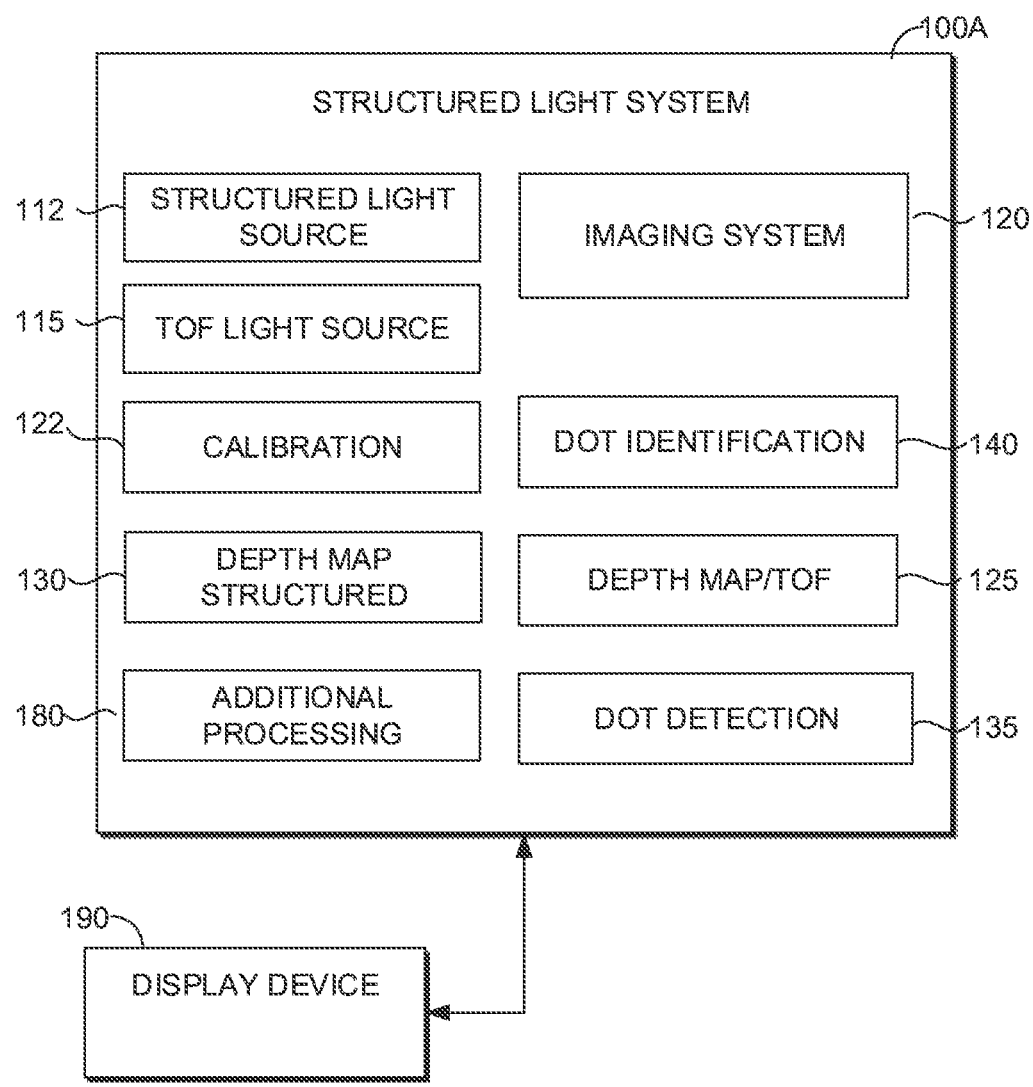
FIG. 2 is a block diagram of an example structured light system, in accordance with an aspect of the technology described herein.

FIG. 2 schematically represents an example of a structured light system 100A suitable for determining a depth map from a structured light image. Structured light system 100A includes the same components of structured light system 100 described with reference to FIG. 1, except that structured light system 100A includes a separate TOF light source 115 and a separate structured light source 112. The TOF light source 115 emits modulated light suitable for TOF depth calculations. The structured light source 112 emits structured light that is not modulated.

Figure 10:
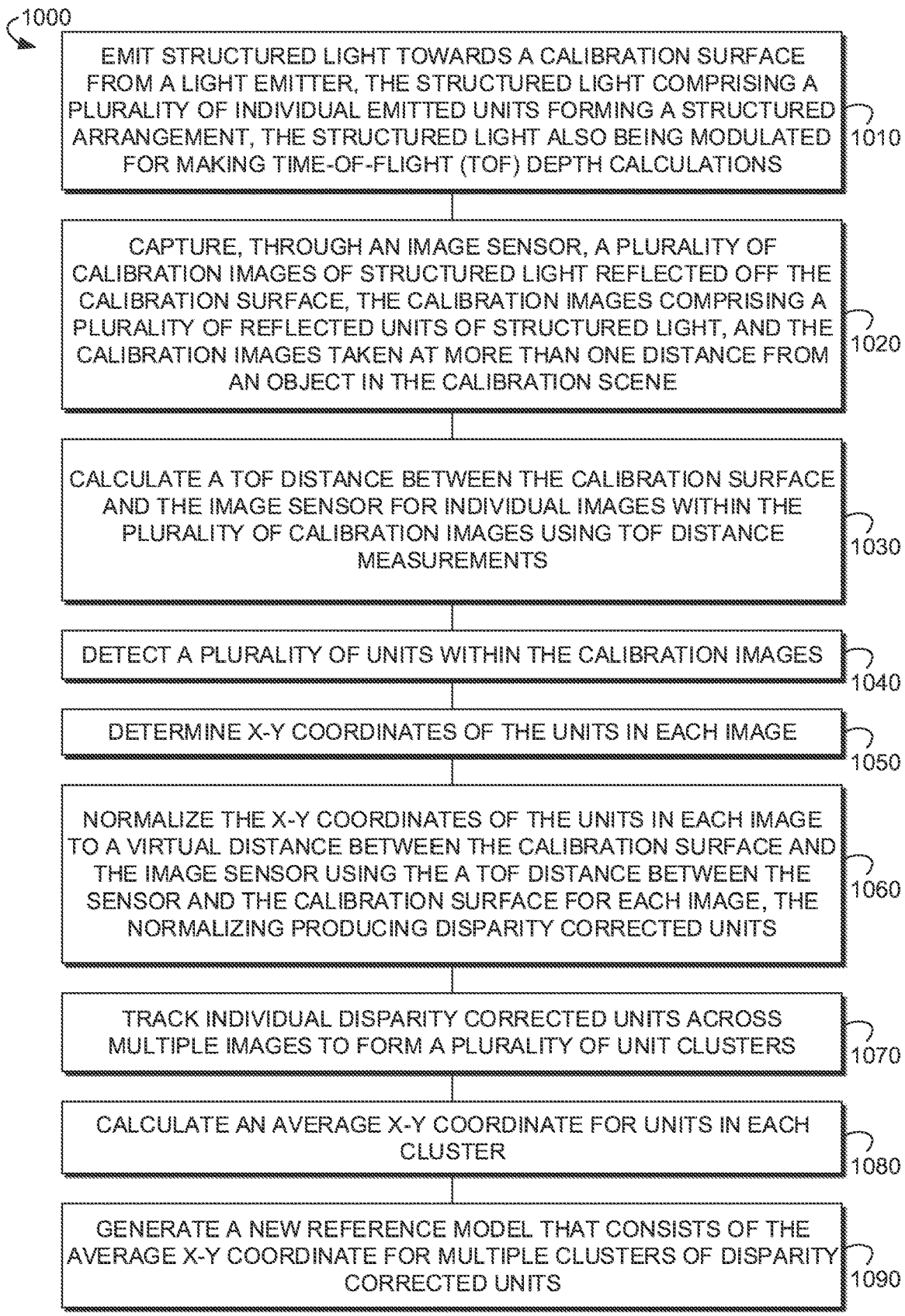

Turning now to FIG. 10, a method 1000 of calibrating a structured light sensor is described, according to an aspect of the technology described herein. Method 1000 can be performed by a structured light system, such as system 100 described previously.

At step 1010, structured light is emitted towards a scene from a light emitter. The structured light comprises a plurality of individual emitted units forming a structured arrangement. The structured light is also modulated for making time-of-flight (TOF) depth calculations. The light emitted can be described as modulated-structured light. In this discussion, a structured light image corresponds to an image derived in part from use of a structured light source.

A structured light source corresponds to a light source or illumination source that projects a plurality of units (e.g., dots) arranged to form a pattern or structure. In some aspects, the light source for projecting a structured light image can be an infrared light source and/or another light source with reduced or minimized detectability in the visible spectrum. This can allow the structured light image to be projected onto an environment while having a reduced or minimized impact on images obtained using conventional visible light cameras (and/or other visible light detectors). The structured light image can then be captured using a corresponding camera (and/or other detector) suitable for detection of the type of light projected by the structured light source.

The units of the structured light image can correspond to any convenient type of reference pattern, so long as the reference pattern at any point in time is known at the time of calibration (such as predetermined). In various aspects, the number of units projected by a structured light source can be substantially smaller than the number of pixels used to represent an environment. As a result, the number of pixels illuminated by a dot, or other unit, from a structured light source can be substantially less than the total number of pixels. This can be in contrast to the light images projected by typical time-of-flight systems, where the projected illumination can correspond to continuous illumination or a "flood fill" that illuminates all or substantially all of the pixels in a view. For example, for a structured light image based on illumination from a structured light source, the number of pixels that are (at least partially) illuminated by a dot can be 60% or less of the total number of pixels in the field of view corresponding to an environment, or 50% or less, or 25% or less, or 10% or less, or possibly even 1% or less. It is further noted that in aspects where the number of dots projected in a structured light image is substantially less than the number of pixels in a corresponding field of view, the dots projected in the structured light image may have overlap with more than one pixel.

In aspects, the technology described herein outputs both a structured light and modulated light through a single light emitter. In this way, the modulated light does not flood the field, but instead follows a ratio consistent with a structured light system and each pixel may not receive modulated light. In another aspect, the system uses separate emitters to output structured light and modulated light. Reflections from the two light sources can be captured by a single imaging sensor. When two different emitters are used, frequencies need to be coordinated to differentiate the reflections from the two sources. Either way, the depth determined by TOF from the reflected modulated light can be used to assign a depth to each unit of the structured light received.

The emitter outputs structured light that is also modulated light. In an example, the source of modulated light may be an incoherent light source, which emits transmitted light that is modulated with a signal at a modulation frequency. In an example, the light from the device may be modulated rapidly, such that the amount of illumination changes periodically. In a phase modulation system, the light emitter can output light at multiple modulation frequencies. The light emitter may be selected so that the wavelength of the emitted light is the most appropriate wavelength for a particular application. In an aspect, the light source may be selected to be a source of light of an appropriate wavelength for the application for which it is intended.

At step 1020, a plurality of calibration images of the structured light reflected off the scene is captured through an image sensor. The images comprise a plurality of reflected units of structured light. The image sensor can also capture a modulation or frequency of the reflected light for use in calculating a TOF depth. In one aspect, the plurality of calibration images are captured as a user moves the sensor towards and away from a largely multi-path free surface, such as a wall. Accordingly, different calibrations images are captured at different depths.

At step 1030, a time-of-flight distance between the calibration surface and the image sensor is calculated for individual images within the plurality of calibration images using time-of-flight distance measurements. The light source illuminates the calibration surface and at least some of the light is reflected back toward the camera from the surface. The reflected light may be detected by the image sensor. The reflected light is also modulated and may be out of phase with the transmitted light due to the delay caused by the distance the light has traveled on the return trip between the sensor and the object. For each pixel of the image sensor, the amplitude and phase difference of the received signal relative to the transmitted light may be determined and used to calculate a depth for the calibration surface. This process is repeated for each calibration image.

At step 1040, the units in the structured light pattern are identified. Before a TOF z-depth is calculated for each unit, the units may first be identified within the image. As mentioned, the light is emitted in a pattern. A first step can be to isolate light by frequency to focus the analysis on content within a frequency corresponding to the emitted light. Even within the relevant light frequency, the image can include noise and other content that are not dots. Units, described as dots herein, can be identified by obtaining a binary segmentation of the image such that each pixel is classified as (1) covering a dot or (2) not covering a dot. A pixel covering a dot can also be referred to as a pixel associated with a dot. This can also include determining an intensity profile based on the intensities for each detected dot. With regard to detecting the presence (or absence) of a dot at a pixel, a variety of strategies can be available. One option can be to perform thresholding based on a global threshold value. If the detected intensity at a pixel is greater than the global threshold value, then the pixel is considered to be associated with a dot. Once the dots are isolated from noise in the reflected image, and therefore detected, a z-depth can be calculated.

At step 1050, the x-y coordinates of the units in each image are determined.

At step 1060, normalized images are generated by normalizing the x-y coordinates of the units in each image to a virtual distance between the calibration surface and the image sensor using the time-of-flight distance between the sensor and the calibration surface for each image. The normalizing produces disparity corrected units. The normalized images depict what the structured light images would look like if all the images were taken at the same distance from the calibration scene.

The TOF z-depth for each dot can be used to calculate an adjusted x-y value for each dot that effectively moves the dot to the position it would appear at were the z-depth at infinity and allows for a correspondence to the projected image to be made. For a single dot in the reflected image having a coordinate X_DOT, Y_DOT, Z_DOT_TOF, the TOF-depth adjusted location (X_ADJUSTED, Y_ADJUSTED) can be calculated as follows:

$$Y\_ADJUSTED = Y\_DOT \text{ (so this dimension doesn't change)}$$

$$X\_ADJUSTED = X\_DOT - c/Z\_DOT\_TOF$$

Where c is a constant that is a function of the baseline distance between the illumination and the imaging sensor and the distance between the imaging sensor and the imaging optics. The above equation assumes that the imaging sensor and the light emitter are located in a side-by-side arrangement next to each other along the x-axis. However, aspects can work with a device that has the imaging sensor and the light emitter in a top-to-bottom arrangement along the y-axis, in which case the X_ADJUSTED=X_DOT and Y_ADJUSTED=Y_DOT−c/Z_DOT_TOF. In some implementations, the illumination may have an arbitrary relationship to the sensor, with some combination of x, y, and z baseline distance, not purely in one axis. In an alternate implementation, the dot locations may be transformed to an arbitrary z-distance, not restricted to infinity. This process can be repeated for each dot or unit detected, until each unit is repositioned to form the TOF-adjusted structured light image.

At step 1070, individual disparity corrected units taken from multiple images form a plurality of unit clusters.

At step 1080, an average x-y coordinate for units in each cluster is determined. This average x-y coordinate becomes the new reference location for the unit represented by the cluster.

At step 1090, a new reference model is generated that consists of the average x-y coordinate for multiple clusters of disparity corrected units. The new reference model can be used to calculate distances to objects using the structured light reflection.

In one aspect, the reflected unit is mapped to a corresponding emitted unit using x-y coordinates within the image and the TOF z-depth for the reflected unit. Dot identification or mapping attempts to identify a correspondence between detected dots in the image with projected dots. In an aspect, each unit in the projected image is assigned a unique identification corresponding to an identified unit in the projected image. The TOF z-depth is used to assign a corresponding identity to each observed dot in the image.

Turning now to FIG. 11, a method 1100 of calibrating a structured light sensor is described, according to an aspect of the technology described herein. Method 1100 can be performed by a structured light system, such as system 100 described previously.

At step 1110, structured light is emitted towards a calibration scene from a structured light emitter. The structured light comprising a plurality of individual emitted units forming a structured arrangement. The calibration scene can comprise a wall, a group of objects, or some other environment.

At step 1120, modulated light is emitted towards the calibration scene from a modulated light emitter. The modulated light is modulated for making time-of-flight (TOF) depth calculations.

At step 1130, a plurality of calibration images of the structured light and the modulated light reflected off the calibration scene are captured by an image sensor. The calibration images captured with the image sensor at more than one distance from the calibration scene. The image sensor can be moved to different distances by a user as part of the calibration process. The image sensor can output a user interface that provides guidance to the user about where to place the image sensor.

At step 1140, a plurality of distances from the image sensor to different portions of the calibration scene are calculated using TOF data derived from the modulated light reflected off the calibration scene. Calculating distances using TOF data has been described previously.

At step 1150, a disparity-corrected individual calibration image is generated by resampling the first portion according to the plurality of distances. The pixel shift along the x-axis can be calculated using:

$$X\_ADJUSTED = X\_DOT - c/Z\_TOF$$

Where c is a constant that is a function of the baseline distance between the illumination and the imaging sensor and the distance between the imaging sensor and the imaging optics. The above equation assumes that the imaging sensor and the light emitter are located in a side-by-side arrangement next to each other along the x-axis. If the camera and emitter are arranged along the y-axis, then the disparity would be along the y-axis.

At step 1160, a new reference image is generated by combining multiple disparity corrected calibration images taken at multiple different distances from the calibration scene as the image sensor is moved around. Combining multiple images corrects for gaps in coverage that may be caused by the disparity correction.

In addition to the above, a geometric correction and light intensity correction may be performed. A calibration image can be scaled to correct for 1/distance^2 illumination drop-off. As the illumination from the sensor spreads out as distance from the sensor increases, the light becomes progressively weaker. Using the TOF range information, a z-distance for each pixel containing a light unit is calculated. This distance is used as a scaling factor and applied to each pixel in the reference image to generate a corrected pixel intensity. The scaling factor is applied by multiplying the pixel intensity by the TOF distance squared.

Turning now to FIG. 12, a method 1200 of calibrating a structured light sensor is described, according to an aspect of the technology described herein. Method 1200 can be performed by a structured light system, such as system 100 described previously.

At step 1210, structured light is emitted towards a calibration scene from a structured light emitter. The structured light comprises a plurality of individual emitted units forming a structured arrangement. In this discussion, a structured light image corresponds to an image derived in part from use of a structured light source. A structured light source corresponds to a light source or illumination source that projects a plurality of units (e.g., dots) arranged to form a pattern or structure. In some aspects, the light source for projecting a structured light image can be an infrared light source and/or another light source with reduced or minimized detectability in the visible spectrum. This can allow the structured light image to be projected onto an environment while having a reduced or minimized impact on images obtained using conventional visible light cameras (and/or other visible light detectors). The structured light image can then be captured using a corresponding camera (and/or other detector) suitable for detection of the type of light projected by the structured light source.

The units of the structured light image can correspond to any convenient type of reference pattern, so long as the reference pattern at any point in time is known at the time of calibration (such as predetermined). In various aspects, the number of units projected by a structured light source can be substantially smaller than the number of pixels used to represent an environment. As a result, the number of pixels illuminated by a dot, or other unit, from a structured light source can be substantially less than the total number of pixels.

At step 1220, modulated light is emitted towards the calibration scene from a modulated light emitter. The modulated light is modulated for making time-of-flight (TOF) depth calculations. In an example, the source of modulated light may be an incoherent light source, which emits transmitted light that is modulated with a signal at a modulation frequency. In an example, the light from the device may be modulated rapidly, such that the amount of illumination changes periodically. In a phase modulation system, the light emitter can output light at multiple modulation frequencies. The light emitter may be selected so that the wavelength of the emitted light is the most appropriate wavelength for a particular application. In an aspect, the light source may be selected to be a source of light of an appropriate wavelength for the application for which it is intended.

At step 1230, a plurality of calibration images of the structured light and the modulated light reflected off the calibration scene is captured through an image sensor. The images comprise a plurality of reflected units of structured light. The system uses separate emitters to output structured light and modulated light. Reflections from the two light sources can be captured by a single imaging sensor. When two different emitters are used, frequencies need to be coordinated to differentiate the reflections from the two sources. The calibration images can be taken at different distances from the calibration scene as the user moves the sensor different distances from the calibration scene. The calibration scene can comprise a flat surface, such as a wall.

At step 1240, a TOF z-depth for the calibration scene for the plurality of calibration images is calculated using the modulation of the reflected modulated light detected at the image sensor. The light source may illuminate an object within the field of the camera and at least some of the light is reflected back toward the camera from the object. The reflected light may be detected by the image sensor. The reflected light is also modulated and the reflected light may be out of phase with the transmitted light due to the delay caused by the distance the light has traveled on the return trip between the sensor and the calibration scene. For each pixel of the image sensor, the amplitude and phase difference of the received signal relative to the transmitted light may be determined for each modulation frequency and used to calculate a depth for the image.

At step 1250, the plurality of calibration images are normalized to a virtual distance between the calibration scene and the image sensor, the normalization using the TOF distance between the sensor and the calibration scene for each image. The normalized calibration images comprising disparity corrected units. The TOF z-depth for each dot can be used to calculate an adjusted x-y value for each dot that effectively moves the dot to the position it would appear at were the z-depth at infinity and allows for a correspondence to the projected image to be made. For a single dot in the reflected image having a coordinate X_DOT, Y_DOT, Z_DOT_TOF, the TOF-depth adjusted location (X_ADJUSTED, Y_ADJUSTED) can be calculated as follows:

$$Y\_ADJUSTED = Y\_DOT \text{ (so this dimension doesn't change)}$$

$$X\_ADJUSTED = X\_DOT - c/Z\_DOT\_TOF$$

Where c is a constant that is a function of the baseline distance between the illumination and the imaging sensor and the distance between the imaging sensor and the imaging optics. The above equation assumes that the imaging sensor and the light emitter are located in a side-by-side arrangement next to each other along the x-axis. However, aspects can work with a device that has the imaging sensor and the light emitter in a top-to-bottom arrangement along the y-axis, in which case the X_ADJUSTED=X_DOT and Y_ADJUSTED=Y_DOT-c/Z_DOT_TOF. In some implementations, the illumination may have an arbitrary relationship to the sensor, with some combination of x, y, and z baseline distance, not purely in one axis. In an alternate implementation, the dot locations may be transformed to an arbitrary z-distance, not restricted to infinity. This process can be repeated for each dot or unit detected, until each unit is repositioned to form the TOF-adjusted structured light image.

At step 1260, individual disparity corrected units across multiple calibration images are tracked to form a plurality of unit clusters.

At step 1270, an average x-y coordinate for disparity corrected units in each cluster is calculated.

At step 1280, a new reference model that consists of the average x-y coordinate for each clusters of disparity corrected units is generated.

Exemplary Operating Environment

Figure 13:
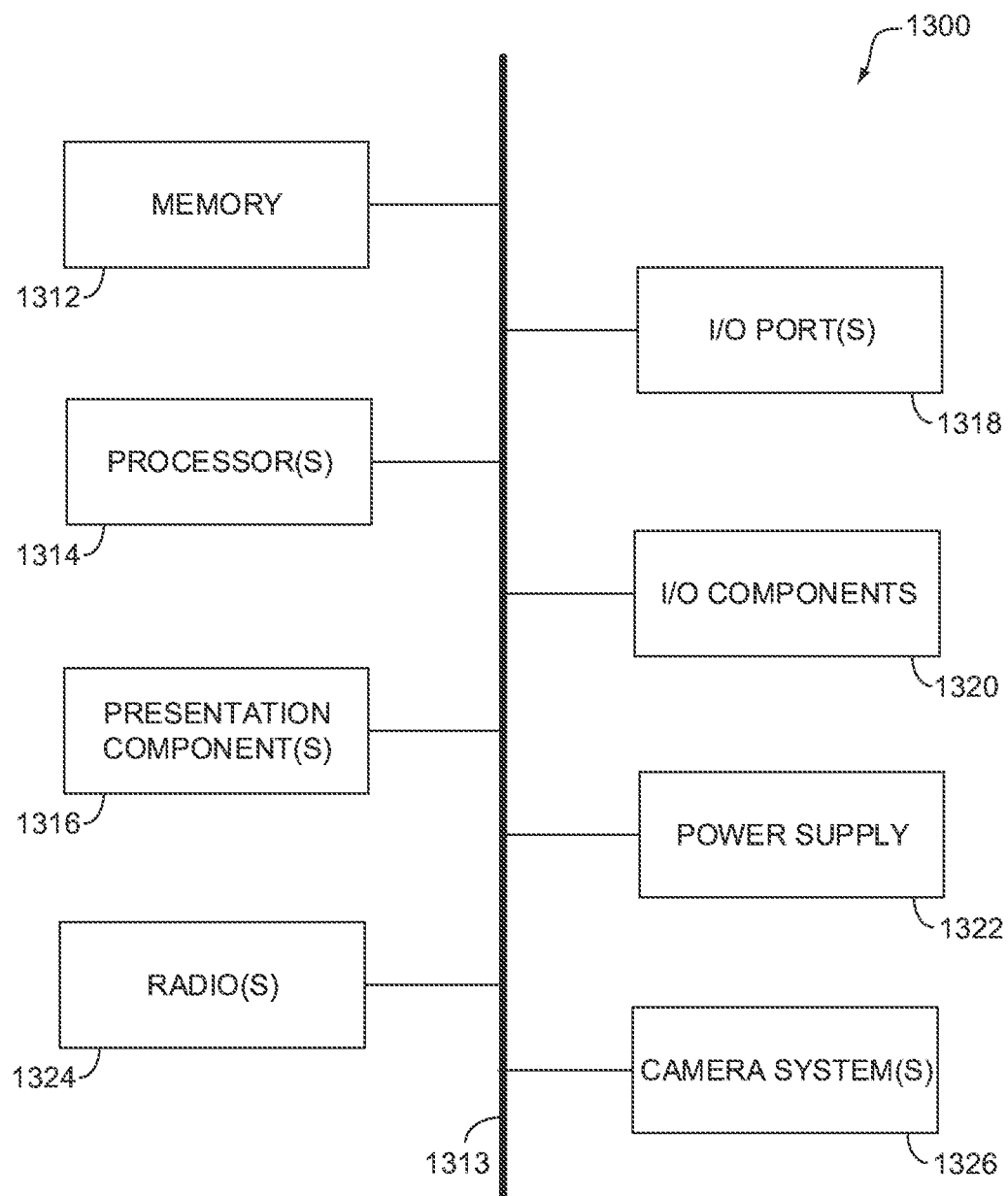
FIG. 13 is a block diagram of an exemplary computing environment suitable for use in implementing aspects of the technology described herein.

Referring to the drawings in general, and initially to FIG. 13 in particular, an exemplary operating environment for implementing aspects of the technology described herein is shown and designated generally as computing device 1300. Computing device 1300 is but one example of a suitable computing environment and is not intended to suggest any limitation as to the scope of use of the technology described herein. Neither should the computing device 1300 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 13, computing device 1300 includes a bus 1310 that directly or indirectly couples the following devices: memory 1312, one or more processors 1314, one or more presentation components 1316, input/output (I/O) ports 1318, I/O components 1320, and an illustrative power supply 1322. Bus 1310 represents what may be one or more busses (such as an address bus, data bus, or a combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 13 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 13 and refer to "computer" or "computing device."

Computing device 1300 typically includes a variety of computer-readable media. Computer-readable media can be any available media that can be accessed by computing device 1300 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1312 includes computer storage media in the form of volatile and/or nonvolatile memory. The memory 1312 may be removable, non-removable, or a combination thereof. Exemplary memory includes solid-state memory, hard drives, optical-disc drives, etc. Computing device 1300 includes one or more processors 1314 that read data from various entities such as bus 1310, memory 1312, or I/O components 1320. Presentation component(s) 1316 present data indications to a user or other device. Exemplary presentation components 1316 include a display device, speaker, printing component, vibrating component, etc. I/O ports 1318 allow computing device 1300 to be logically coupled to other devices, including I/O components 1320, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1314 may be direct or via a coupling utilizing a serial port, parallel port, and/or other interface and/or system bus known in the art. Furthermore, the digitizer input component may be a component separated from an output component such as a display device, or in some aspects, the useable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 1300. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1300. The computing device 1300 may be equipped with camera systems 1326. The camera system 1326 can include depth cameras, such as stereoscopic camera systems, infrared camera systems, RGB camera systems, structured light camera systems, TOF camera systems, and combinations of these, for generating depth images. The depth images can be used in gesture detection and recognition, displayed to a user, or used to generate augmented reality, virtual reality, or other imagery. Additionally, the computing device 1300 may be equipped with accelerometers or gyroscopes that enable detection of motion. The output of the accelerometers or gyroscopes may be provided to the display of the computing device 1300 to render immersive augmented reality or virtual reality.

A computing device may include a radio 1324. The radio 1324 transmits and receives radio communications. The computing device may be a wireless terminal adapted to receive communications and media over various wireless networks. Computing device 1300 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The computing device 1300 can take the form of an augmented reality device. One potential application for the depth image produced by the technology described herein can be for determining a mesh representation of an environment for an augmented reality device. An augmented reality device can support the presentation of augmented reality (and/or mixed-reality) images. Augmented reality images include augmented reality objects, which are virtualized objects or entities (e.g., holographic content or mixed-reality content), that are rendered for a user associated with the augmented reality device. In some aspects, free space input detected by an augmented reality device can also be used to control the device and/or interact with the environment. For example, one or more objects in an augmented reality image can be rendered based on a real world environment, where the real world environment can be captured in a digital representation by the augmented reality device. Understanding the real world environment can be based on several different techniques that provide the augmented reality device with information about the environment. This can include scanning an environment in real time and generating a mesh representation of the environment to provide the augmented reality device with information about the environment. Augmented reality devices can include head-mounted devices.

If a depth map of the environment is available, the mesh representation can also be used to display an augmented reality image to a user that appears to incorporate the scanned environment. This can allow, for example, a user to navigate through a real world environment based on augmented reality objects and/or to view augmented reality objects in combination with the real world environment. Additionally or alternatively, this can allow an augmented reality device to detect user movements in the environment in order to convert the user movements into inputs for controlling the augmented reality device (e.g., gesture detection).

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. A method of calibrating a structured light sensor, comprising:
    emitting structured light towards a calibration surface from a light emitter, the structured light comprising a plurality of individual emitted units forming a structured arrangement, the structured light also being modulated for making time-of-flight (TOF) depth calculations;
    capturing, through an image sensor, a plurality of calibration images of the structured light reflected off the calibration surface, the calibration images comprising a plurality of reflected units of the structured light, and the calibration images taken at more than one distance from an object in the calibration surface;
    calculating a time-of-flight distance between the calibration surface and the image sensor for individual images within the plurality of calibration images using time-of-flight distance measurements;
    detecting the plurality of reflected units within the calibration images;
    determining x-y coordinates for the plurality of reflected units in the calibration images;
    generating normalized calibration images by normalizing the x-y coordinates of the reflected units in each image to a virtual distance between the calibration surface and the image sensor using the TOF distance between the image sensor and the calibration surface for each image, the normalizing producing a plurality of disparity corrected units;
    tracking individual disparity corrected units from the plurality of disparity corrected units across multiple images of the calibration images to form a plurality of unit clusters;
    calculating an average x-y coordinate for units in each cluster within the plurality of unit clusters; and
    generating a new reference model that consists of the average x-y coordinate for each clusters from the plurality of disparity corrected units.

2. The method of claim 1, wherein the individual emitted units are dots.

3. The method of claim 1, wherein the structured arrangement is a repeating pattern.

4. The method of claim 1, further comprising calculating an updated baseline distance between the image sensor and the light emitter using time-of-flight distance calculations for the plurality of reflected units identified in the multiple images of the calibration images taken at different distances.

5. The method of claim 1, further comprising mapping the plurality of reflected units in several of the calibration images to a corresponding emitted unit using x-y coordinates within an individual image of the calibration images.

6. The method of claim 1, further comprising outputting a calibration instruction that prompts a user to move the image sensor towards and away from the calibration surface.

7. The method of claim 1, wherein emitted structured light is in the infrared spectrum.

8. A method of calibrating a structured light sensor, comprising:
    emitting structured light towards a calibration scene from a structured light emitter, the structured light comprising a plurality of individual emitted units forming a structured arrangement;
    emitting modulated light towards the calibration scene from a modulated light emitter, the modulated light being modulated for making time-of-flight (TOF) depth calculations;
    capturing, through an image sensor, a plurality of calibration images of the structured light and the modulated light reflected off the calibration scene, the calibration images captured with the image sensor at more than one actual distance from the calibration scene;
    for an individual calibration image, calculating a plurality of measured distances from the image sensor to different portions of the calibration scene using TOF data derived from the modulated light reflected off the calibration scene;
    generating a disparity-corrected individual calibration image by resampling the portions of the individual calibration image according to the plurality of measured distances; and
    generating a new reference image by combining multiple disparity corrected calibration images.

9. The method of claim 8, further comprising outputting a calibration instruction that prompts a user to move the image sensor towards and away from the calibration scene.

10. The method of claim 8, wherein the calibration scene comprises a first surface and a second surface that are substantially parallel to each other, the first surface separated from the second surface by a distance measured orthogonally to the first surface and the second surface.

11. The method of claim 8, further comprising contrast correcting the calibration images for estimated object reflectivity.

12. The method of claim 8, further comprising correcting the calibration images for illumination intensity drop-off using a TOF z-depth for each calibration image.

13. The method of claim 8, wherein the structured light and the modulated light are emitted through a single emitter.

14. The method of claim 8, wherein emitted structured light is in the infrared spectrum.

15. The method of claim 8, wherein the structured arrangement is a repeating pattern.

16. A method of calibrating a structured light sensor, comprising:

emitting structured light towards a calibration scene from a structured light emitter, the structured light comprising a plurality of individual emitted units forming a structured arrangement;

emitting modulated light towards the calibration scene from a modulated light emitter, the modulated light being modulated for making time-of-flight (TOF) depth calculations;

capturing, through an image sensor, a plurality of calibration images of the structured light and the modulated light reflected off the calibration scene, the calibration images captured with the image sensor at more than one depth from the calibration scene;

calculating a TOF z-depth for the plurality of calibration images using a modulation of the modulated light detected at the image sensor;

generating normalized calibration images by normalizing the plurality of calibration images to a virtual distance between the calibration scene and the image sensor, the normalizing performed using the TOF z-depth between the image sensor and the calibration scene for each image, the normalized calibration images comprising disparity corrected units;

tracking individual disparity corrected units across multiple normalized calibration images from the normalized calibration images to form a plurality of disparity corrected unit clusters;

calculating an average x-y coordinate for the disparity corrected units in each disparity corrected unit cluster; and generating a new reference model that consists of the average x-y coordinate for said each disparity corrected unit cluster.

17. The method of claim 16, further comprising calculating an updated baseline distance between the image sensor and the structured light emitter using time-of-flight distance calculations for individual units identified in multiple images taken at different distances.

18. The method of claim 16, further comprising outputting a calibration instruction that prompts a user to move the image sensor towards and away from the calibration scene.

19. The method of claim 16, wherein the calibration scene comprises a substantially multipath free planar surface.

20. The method of claim 16, wherein the method further comprises calculating geometric distortion parameters of a lens of the image sensor by tracking the individual emitted unit locations over multiple frames combined with TOF z-depth information.

* * * * *